United States Patent
Cromer et al.

(10) Patent No.: US 6,286,102 B1
(45) Date of Patent: *Sep. 4, 2001

(54) SELECTIVE WIRELESS DISABLEMENT FOR COMPUTERS PASSING THROUGH A SECURITY CHECKPOINT

(75) Inventors: Daryl Cromer, Cary; Richard Dayan, Wake Forest; Howard Locker; Mike Steinmetz, both of Cary; Jim Ward, Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,311

(22) Filed: Dec. 23, 1998

Related U.S. Application Data

(63) Continuation-in-part of application No. 08/640,366, filed on Apr. 30, 1996, now Pat. No. 5,970,227.

(51) Int. Cl.$^7$ ................................ G06F 11/30; H04L 9/00
(52) U.S. Cl. ........................................ 713/200; 340/825.32
(58) Field of Search .................................... 713/200, 201, 713/202; 340/825.31, 825.32; 380/270

(56) References Cited

U.S. PATENT DOCUMENTS

| | | | |
|---|---|---|---|
| 5,097,253 | * | 3/1992 | Eschbach et al. .................... 340/545 |
| 5,111,185 | * | 5/1992 | Kozaki ................................. 340/568 |
| 5,117,457 | * | 5/1992 | Comerford et al. ....................... 380/3 |
| 5,142,626 | * | 8/1992 | Arnold et al. .......................... 710/16 |
| 5,151,684 | * | 9/1992 | Johnsen ................................ 340/572 |
| 5,245,317 | * | 9/1993 | Chidley et al. ....................... 340/571 |
| 5,353,011 | * | 10/1994 | Wheeler et al. ...................... 340/572 |
| 5,388,156 | * | 2/1995 | Blackledge, Jr. et al. ............... 380/4 |
| 5,406,261 | * | 4/1995 | Glenn .................................. 340/571 |
| 5,574,431 | * | 11/1996 | McKeown et al. .................... 340/572 |
| 5,574,786 | * | 11/1996 | Dayan et al. ............................. 380/4 |
| 5,712,973 | * | 1/1998 | Dayan et al. ......................... 713/200 |
| 5,748,083 | * | 5/1998 | Rietkerk ............................... 340/568 |
| 5,754,110 | * | 5/1998 | Appalucci et al. .................... 340/572 |
| 5,793,290 | * | 8/1998 | Eagleson et al. ..................... 340/573 |
| 5,970,227 | * | 10/1999 | Dayan et al. ......................... 395/186 |
| 6,040,773 | * | 3/2000 | Vega et al. ......................... 340/572.1 |

* cited by examiner

*Primary Examiner*—Dieu-Minh T. Le
(74) *Attorney, Agent, or Firm*—George E. Grosser; Andrew Dillon

(57) ABSTRACT

A security system for computers defines a control zone using radiation, preferably at radio frequency, having a distinctive characteristic, such as a particular frequency. The zone may be established, for example, at a door exit or other limited passage to a secured area. The radiation triggers a device in the computer that in turn sends out a serial number signal. To further prevent unauthorized removal a personal identification number is required of the person in the zone with the computer, either by key input or an encoded radio signal. A receiver located near the control zone applies the serial number to a table look up computer that triggers an emergency signal if a match to an authorized list of serial numbers for the computer and corresponding person does not occur. The emergency signal activates a transmitter that sends out an emergency radiation signal with a different distinctive characteristic. A second receiver in the computer then responds to the emergency radiation signal to trigger the security logic to render the computer inoperative.

12 Claims, 19 Drawing Sheets

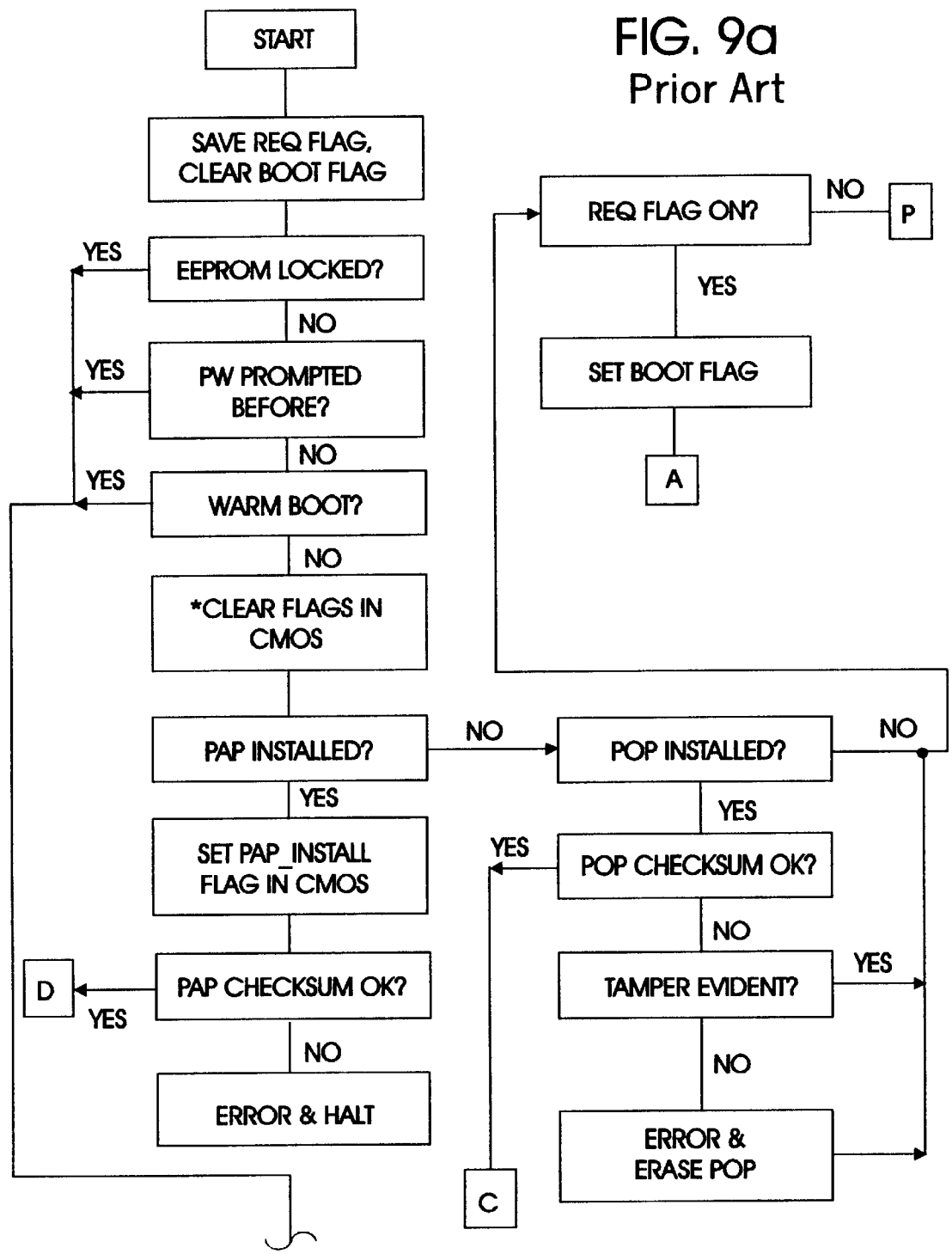

SELECTIVE WIRELESS DISABLEMENT FOR COMPUTERS PASSING THROUGH A SECURITY CHECKPOINT

CROSS REFERENCE TO RELATED APPLICATIONS

This application is a continuation in part of U.S. patent application Ser. No. 08/640366 filed Apr. 30, 1996, entitled "Personal Computer System With Security Feature now, U.S. Pat. No. 5,970,227", the disclosure of which is hereby incorporated by reference.

The invention described herein is related to that described in U.S. Pat. No. 5,388,156, to that described in U.S. application Ser. No. 07/889,325 filed May 22, 1992, entitled "Trusted Personal Computer System With Limited Accessibility" now U.S. Pat. No. 5,712,973 and to that described in U.S. Pat. No. 5,574,786 entitled "Securing Trusted Personal Computer System Against Unauthorized Movement," all of which are held in common ownership with this invention.

BACKGROUND OF THE INVENTION

1. Field of the Invention

The invention relates in general to security for computer systems and, in particular, to a security system for computers, such as laptop computers, that are moved past a checkpoint.

2. Description of the Prior Art

Personal computer systems have attained widespread use for providing computer power to many segments of today's modern society. Personal computer systems can usually be defined as a desk top, floor standing, or portable microcomputer that consists of a system unit having at least one system processor and associated volatile and non-volatile memory, a display monitor, a keyboard, one or more diskette drives, a fixed disk storage, and an optional printer. One of the distinguishing characteristics of these systems is the use of a motherboard (also known as and occasionally mentioned herein as a system board, system planar or planar) to electrically connect these components together. These systems are designed primarily to give independent computing power to a single user and are inexpensively priced for purchase by individuals or small businesses. Examples of such personal computer systems are IBM's PERSONAL SYSTEM/2 Models 90 and 95, IBM PC 300 series, and Think Pad series.

Advances in technology are resulting in smaller form factors for desktop and portable systems. Portables are designed to fit into a standard brief case and some of the small form desktop could also fit into a large brief case. The small size combined with the tremendous computing power has made these computers a target for thieves. This coupled with the growing use of personal computers in the world in recent years, resulting in more information being collected and stored in such systems, has created a security risk. Many computers contain data that is either sensitive to an individual or to a company. In the wrong hands, this data could become damaging to individuals, a company could lose a competitive edge, or sensitive data could be used to force payment for silence. As more users recognize the sensitive nature of data and its value, the more it becomes desirable to protect against such misuse. To protect themselves and the persons associated with the stored data, users are requiring incorporation of security and integrity features into the personal computers that they purchase.

Users are not the only people to recognize the sensitivity of the data being collected and stored. Governments are also enacting laws to enforce protection of sensitive data. One such government is that of the United States. It has recognized and responded to the gravity of the situation. The United States federal government has defined security levels and the associated requirements it takes to meet those levels, and provides a certification agency for personal computer manufacturers to submit products in order to see if the products meet the security level claimed by the manufacturer. The source for the Federal Requirements is the Department of Defense, Trusted Computer System Evaluation Criteria, DOD 5200.28 STD, 12/85, generally referred to as The Orange Book. The government has legislated that by Jan. 1, 1992 all data related to the government must only be processed and stored on personal computers with a minimum security level of C-2. For computer system hardware, the essence of the requirements is contained in the Assurance section, Requirement 6: "trusted mechanisms must be continuously protected against tampering and/or unauthorized changes . . ."

The related Application Ser. No. 840,965 describes a personal computer providing means for limiting access to certain critical data to only those users having a proper privilege to access such data. In realizing this purpose, a specialized memory element is provided for receiving and storing a Power On Password and a Privileged Access Password (sometimes hereinafter called a "POP" and a "PAP" respectively) and for coordinating the access granted to various functions and data to the activation and usage of the passwords. The related Application Ser. No. 08/640366 filed Apr. 30, 1996 describes a security system for computers that defines a control zone using radiation, preferably at radio frequency, having a distinctive characteristic, such as a particular frequency. The zone may be established, for example, at a door exit or other limited passage to a secured area. Thus use of such systems provides protection of physical assets and data but is too restrictive for use in mobile computers. The system may be adapted to selectively allow activation or deactivation of security measures should the circumstances of use so permit. Thus users of such systems are given great flexibility in application of the systems while company or organization can maintain strict security controls. Certain of the teachings of this related Application are described in detail hereinafter in view of its relationship with the invention of the present Application.

BRIEF DESCRIPTION OF THE INVENTION

With the foregoing in mind, the present invention contemplates a new personal computer feature, which makes data stored in a personal computer system inaccessible if transported by an unauthorized person. In particular, the invention addresses the problem of removal of the computer from an area by a person without authorization to remove and disables the computer in response to such removal. Indeed, the present invention responds to removal of a computer authorized for removal but which is being removed by a person not authorized for such removal or who has not provided an personal identity code. For a preferred implementation the computer can be made operative again by providing a correct password.

A personal computer system of the type described above has a first radiation responsive system that emits a radiation signal bearing a coded serial number upon being exposed to radiation having a predefined characteristic. The personal identification number is required of the person in the zone with the computer, either by key input or an encoded radio signal. Receivers in the control zone then trigger a computer to do a search referencing a list of serial numbers authorized for removal by individuals through such zone, which may, for example, be a doorway to a computer room. If the serial number of the computer is not authorized for the identified individual, a signal is sent to trigger transmission of radiation having a second predefined characteristic, different from the first characteristic, which causes a receiver in the computer to activate logic that disables the computer from completing power-on setup, thereby making the computer inoperable.

The preferred new security feature renders the personal computer system inoperable, if an unauthorized individual moves the computer system through a control zone where it is exposed to radiation with a predefined characteristic. Thus, at least, certain data contained within the system components cannot be accessed by an unauthorized user in the event that the system is transported through the control zone or checkpoint.

BRIEF DESCRIPTION OF THE DRAWINGS

Some of the features of the invention having been stated, other features will appear as the description proceeds, when taken in connection with the accompanying drawings, in which:

FIGS. 8a–8c and 9a–9e are schematic flowcharts illustrating certain functions involved in the security options available in accordance with the tamper evident security feature of the prior art which have been modified to include functions involved in the security feature of the present invention;

DETAILED DESCRIPTION OF INVENTION

Figure 1:
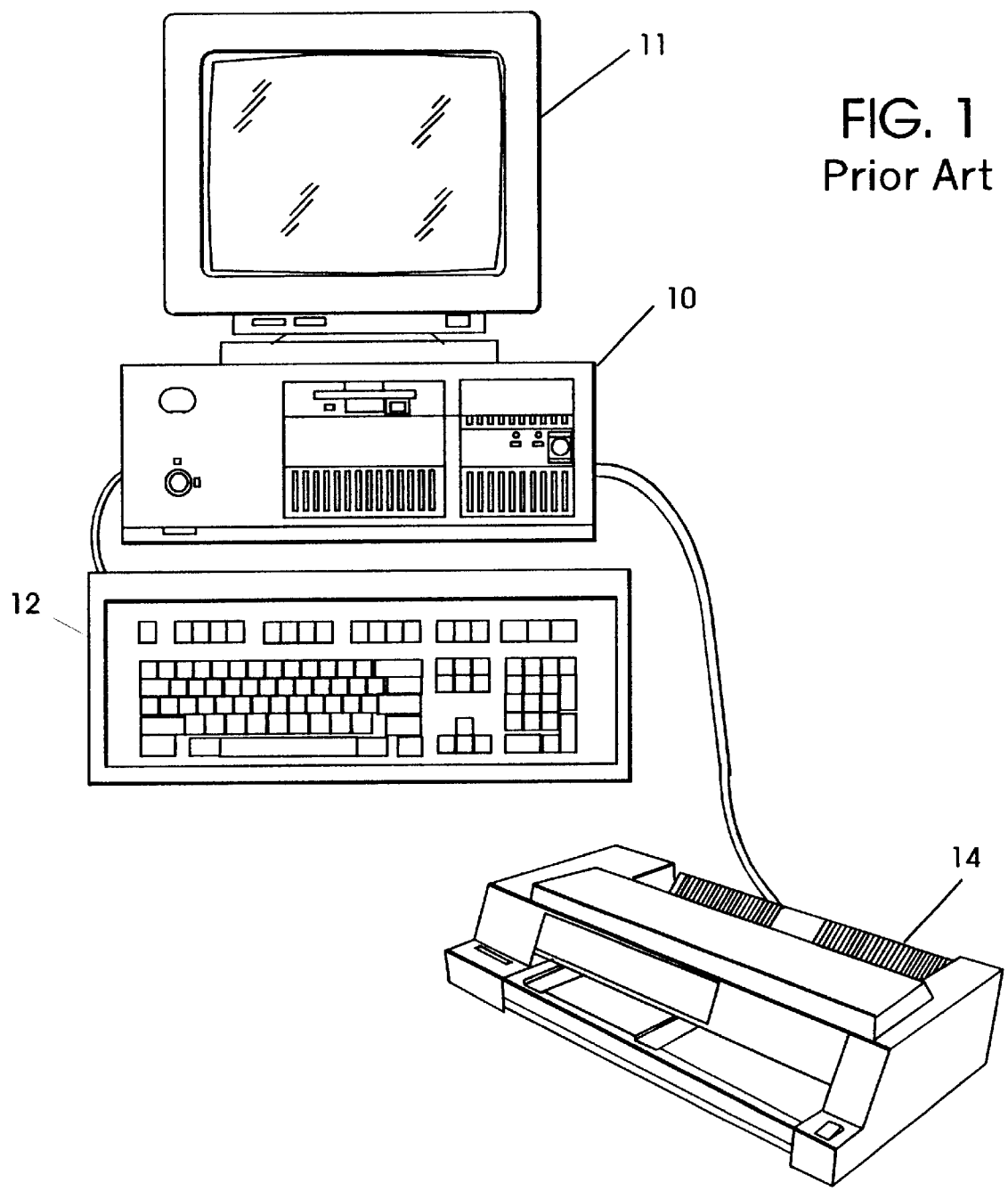
FIG. 1 is a perspective view of a personal computer system embodying this invention.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Certain defined terms may be used herein, as follows:

TRUSTED COMPUTING BASE (TCB): The totality of protection mechanisms within a computer system—including hardware, firmware and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g. a user's clearance) related to the security policy.

TRUSTED SOFTWARE: The software portion of a Trusted Computing Base.

TRUSTED PROGRAM: A program included in Trusted Software.

OPEN PROGRAM: A program operable on a Trusted Computing Base and which is other than a Trusted Program.

REFERENCE MONITOR CONCEPT: An access control concept that refers to an abstract machine that mediates all accesses to objects by subjects.

SECURITY KERNEL: The hardware, firmware and software elements of a Trusted Computing Base that implement the reference monitor concept. It must mediate all accesses, be protected from modification and be verifiable as correct.

TRUSTED COMPUTER SYSTEM: A system that employs sufficient hardware and software integrity measures to allow its use for processing simultaneously a range of sensitive or classified information.

SYSTEM OWNER: The system owner is the user who is responsible for configuring and placing a system in secure mode initially. The system owner will control configuration both initially and whenever an update needs to be made. This person will control the Privileged Access Password and be responsible for maintaining its integrity. The system owner will also maintain physical security of the tamper evident cover keylock key. The system owner also will maintain a database of computer system serial numbers and user identification numbers that are permitted to transport that computer. The system owner will be responsible for maintaining security logs on all systems. The system owner will also have to record all attempted security breaches. The system owner may own more than one system. The system owner is considered an authorized user and can also be a normal user.

SECURE MODE: When a system owner has successfully installed the Privileged Access Password on a personal computer system to invoke security protection provided by the security and integrity elements.

AUTHORIZED USER: Any user who is given permission to use the Privileged Access Password. This person may or may not be the system owner. This person may also have a key for a particular system or a set of systems. If this person is involved in recovering a system from a security breach, they are responsible for reporting it to the system owner. An authorized user may also be a normal user.

NORMAL USER: Any user of a system authorized to use the system facilities. In order to change a system configuration or fix a problem, this user requires the assistance of either the system owner or an authorized user. The normal user does not have the Privileged Access Password or the tamper evident cover keylock key unless they belong to either the authorized user or system owner category.

UNAUTHORIZED USER: Any one not defined as a system owner, authorized user or normal user. Any use of a secured personal computer system by an unauthorized user is considered a security breach, other than an unsuccessful power on, and an audit trail must exist showing such breaches.

AUTHORIZED MOVE: Any movement a computer that has been previously authorized by the system owner. The system owner permits a user (authorized or normal) to move a machine through a security checkpoint without disabling the machine.

UNAUTHORIZED MOVE: Any movement of a computer that has not been previously authorized by the system owner. Attempts to move machine through a security checkpoint will result in disabling the machine.

EEPROM: Electrically Erasable Programmable Read Only Memory. This memory technology provides for non-volatile storage of data that can be changed under control of hardware logic. Contents of storage are not lost when power is absent. Contents may be altered only when the appropriate control signals on the module are activated in the predefined sequence.

PASSWORD DESCRIPTION: The system has the potential to be protected by two passwords: 1. Privileged Access Password (PAP) and 2. Power On Password (POP). These passwords are intended to be used independently of one another. The PAP is designed to provide protection for the system owner by protecting the Initial Program Load (IPL) device boot list, access to the password utility, access system settings, or access to the System Partition in a Micro Channel Architecture (MCA) system. The existence of the PAP will be transparent to a normal user using the POP. The PAP will be installed, changed, or deleted by Power On Self Test (POST) or in the System Partition for MCA systems. The PAP, when set and entered correctly, will give the owner access to the entire system, overriding the POP. The POP, working as on all current IBM systems, is used to prevent any unauthorized access to the Operating System on the DASD or the facilities of the system.

Figure 2:
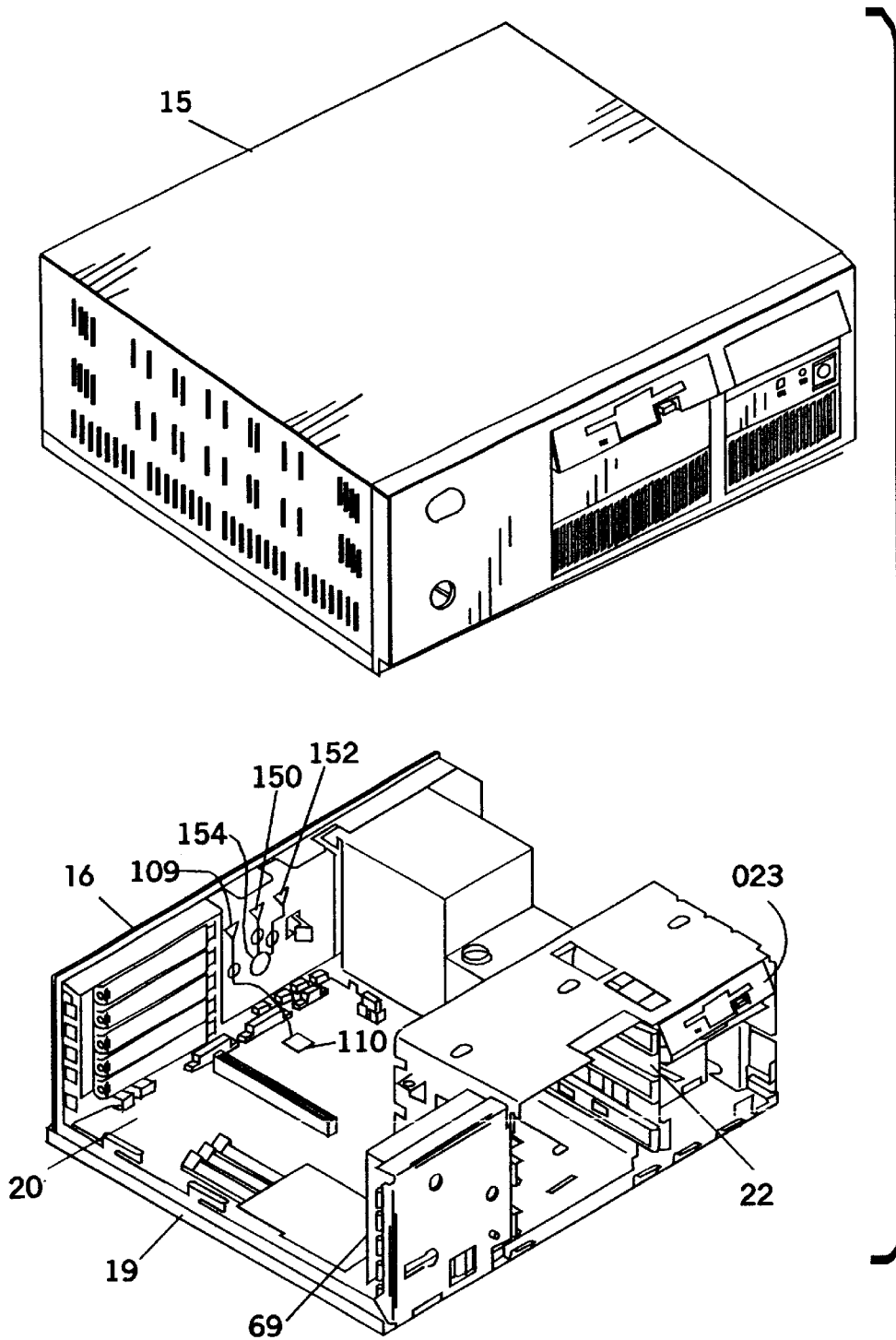
FIG. 2 is an exploded perspective view of certain elements of the personal computer of FIG. 1 including a chassis, a cover, and a planar board and illustrating certain relationships among those elements and further including certain components related to the security feature of the present invention.

Referring now more particularly to the accompanying drawings, a microcomputer system embodying the present invention is there shown and generally indicated at 10 (FIG. 1). The computer system 10 may have an associated monitor 11, keyboard 12 and printer or plotter 14. The computer 10 has a cover 15 which cooperates with a chassis 19 in defining an enclosed, shielded volume for receiving data processing and storage components for processing and storing digital data, as shown in FIG. 2. At least certain of the system components are mounted on a multi layer planar 20 (also commonly called a motherboard or system board) which is mounted on the chassis 19 and provides a means for mounting and electrically interconnecting various components of the computer system 10 including the CPU, system memory and accessory cards or boards as is well known in the art. The chassis 19 has a base and a rear panel 16 and defines at least one open bay 22 for receiving a data storage device such as a disk drive 23.

At the rear panel 16 or other suitable area, according to one aspect of the invention, an antenna 109 is mounted to extend outside computer 10 to collect radiation. The antenna 109 is intended to provide a signal indicating radiation in the vicinity of the computer system 10 and is connected to a detector 110 which is tuned to trigger in response to a particular radiation characteristic, such as a predefined frequency in an allowed radio frequency band.

Figure 8A:
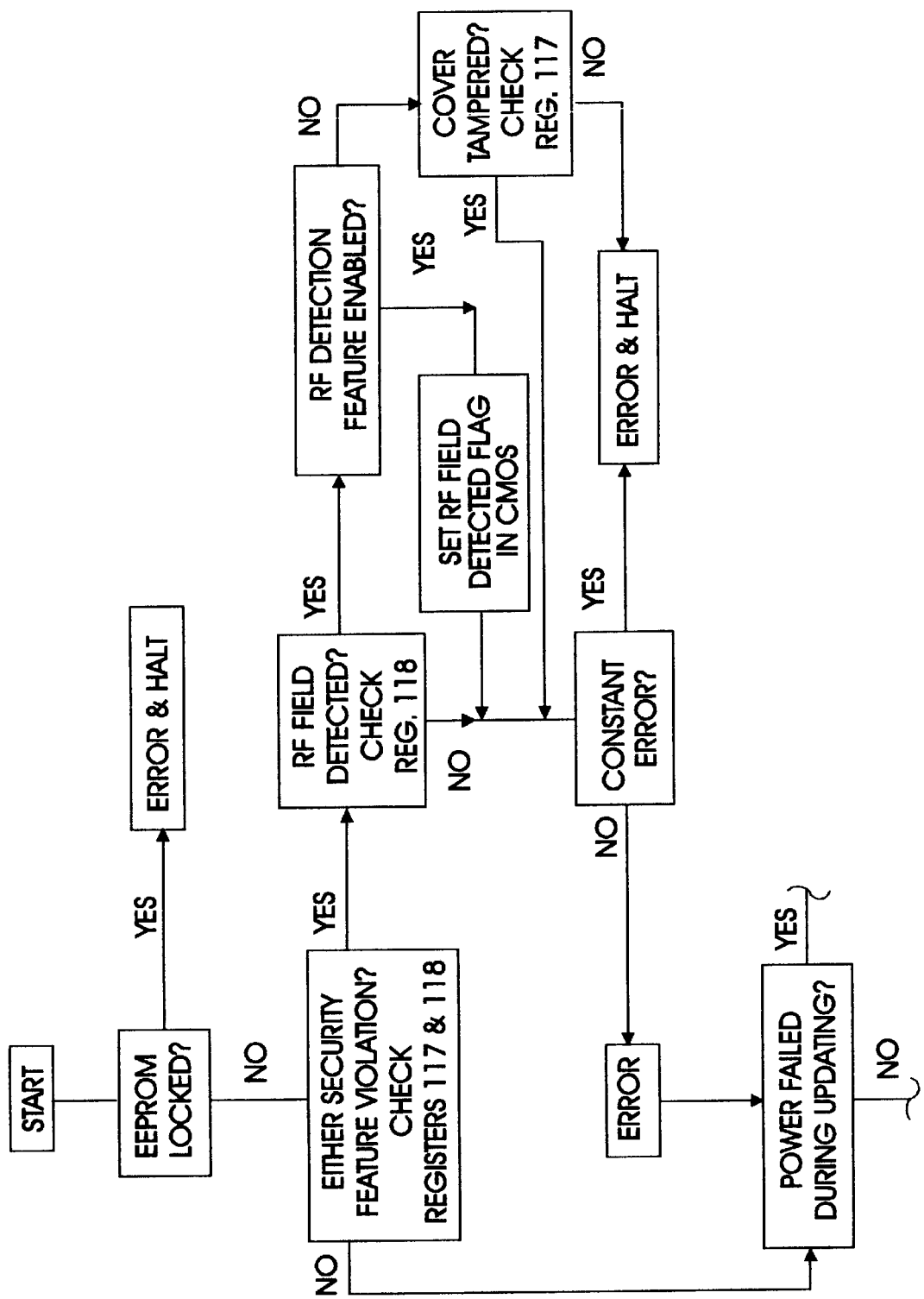
Figure 8B:
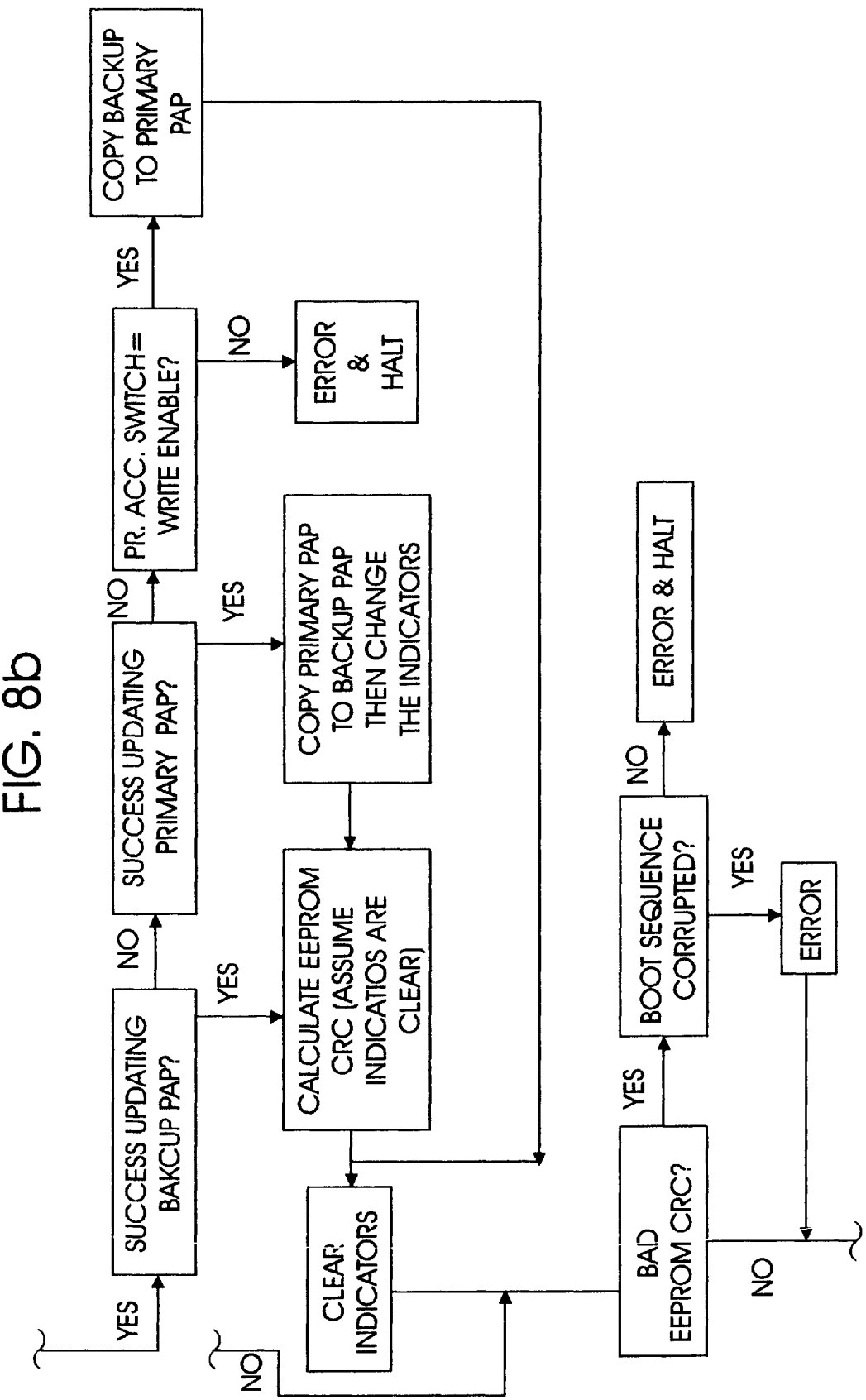
Figure 8C:
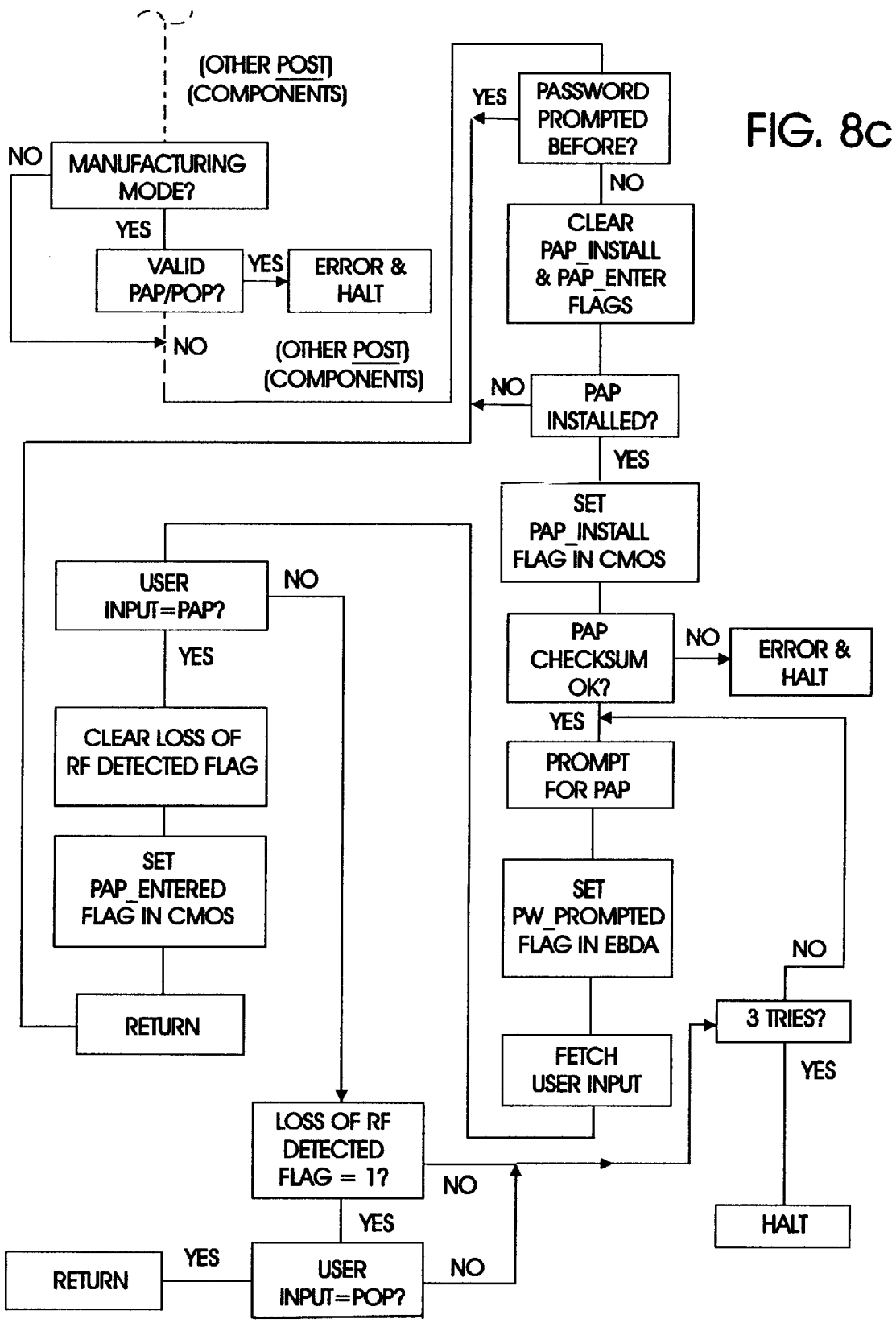
Figure 9B:
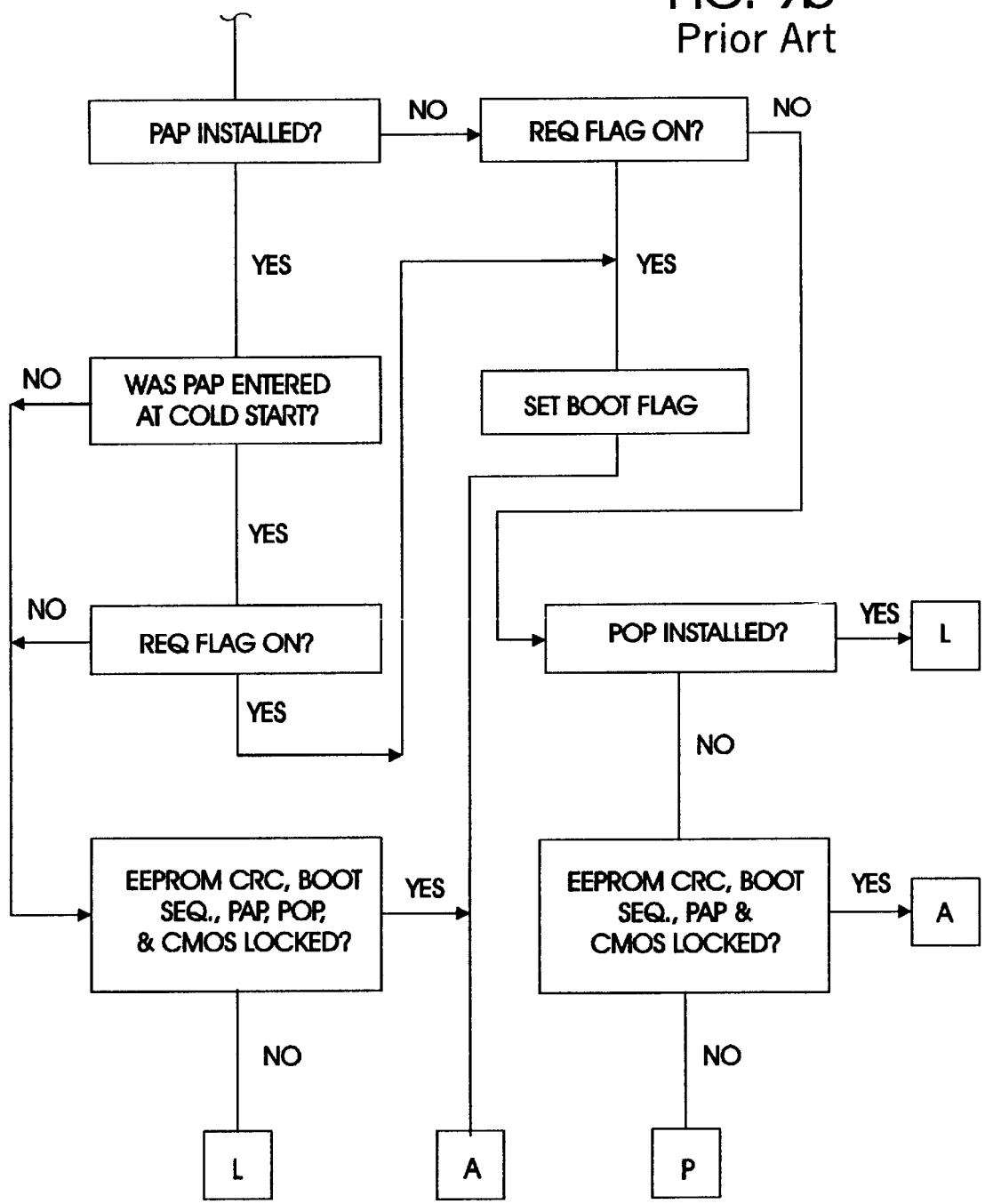
Figure 9C:
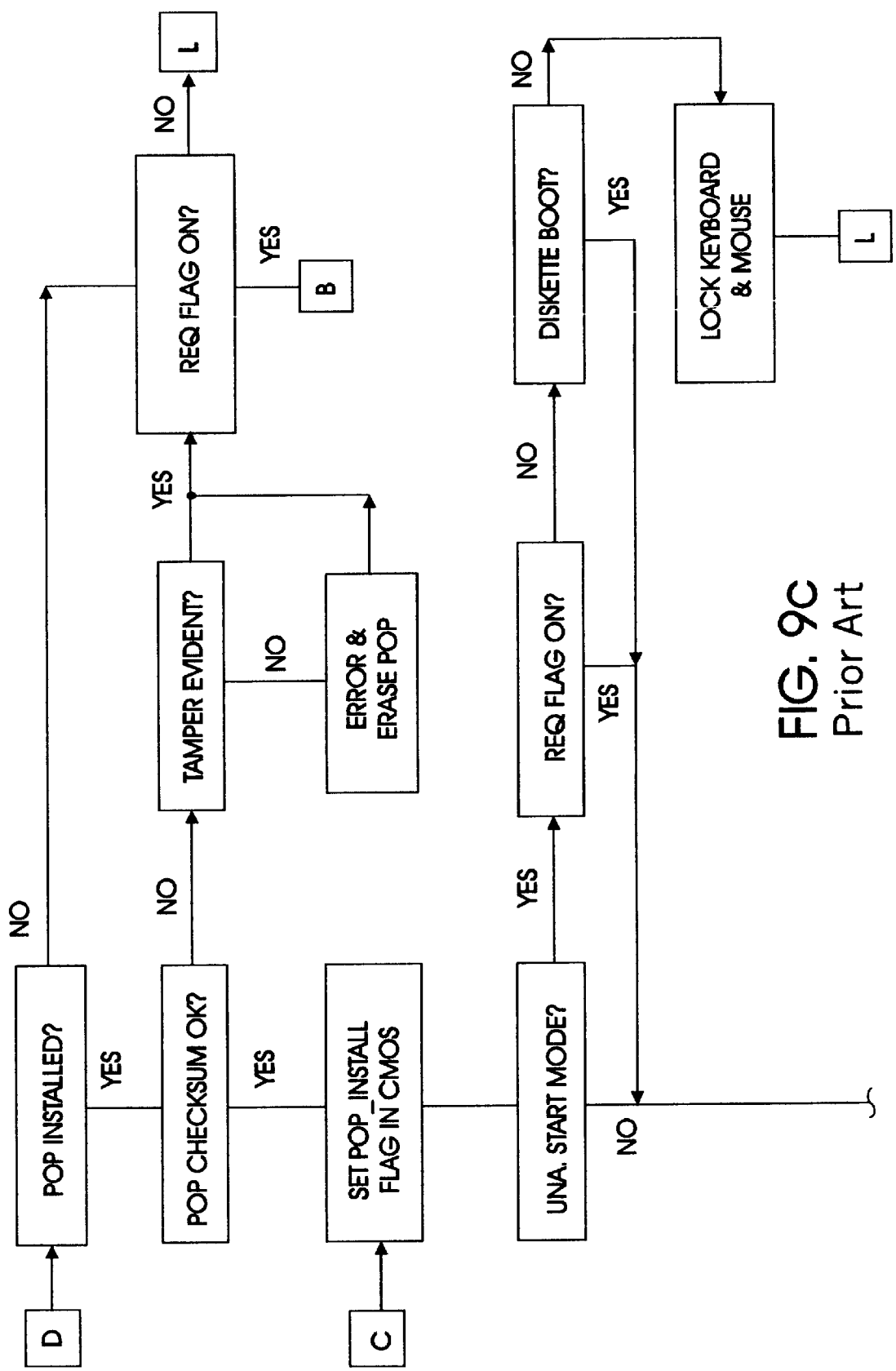
Figure 9D:
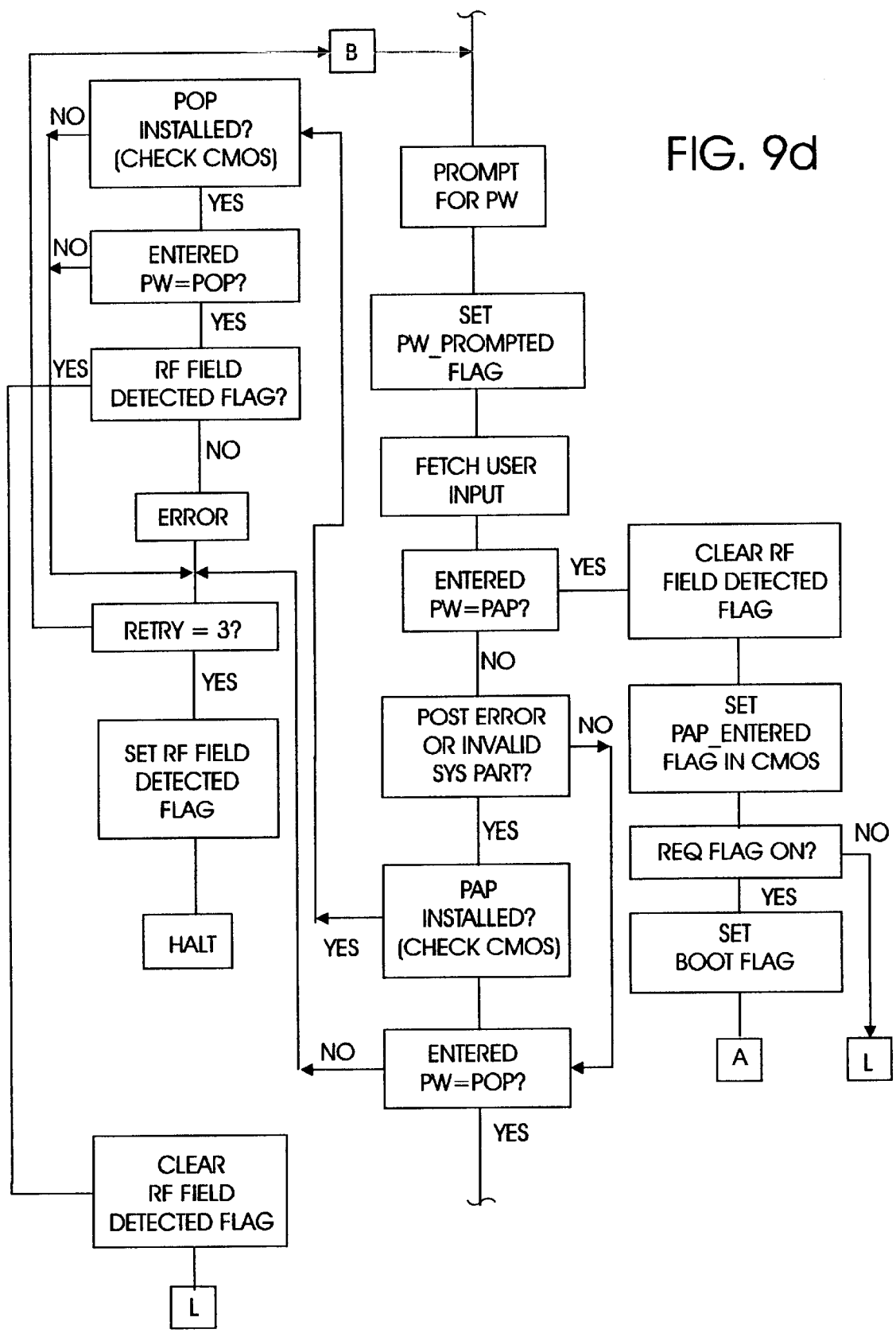
Figure 9E:
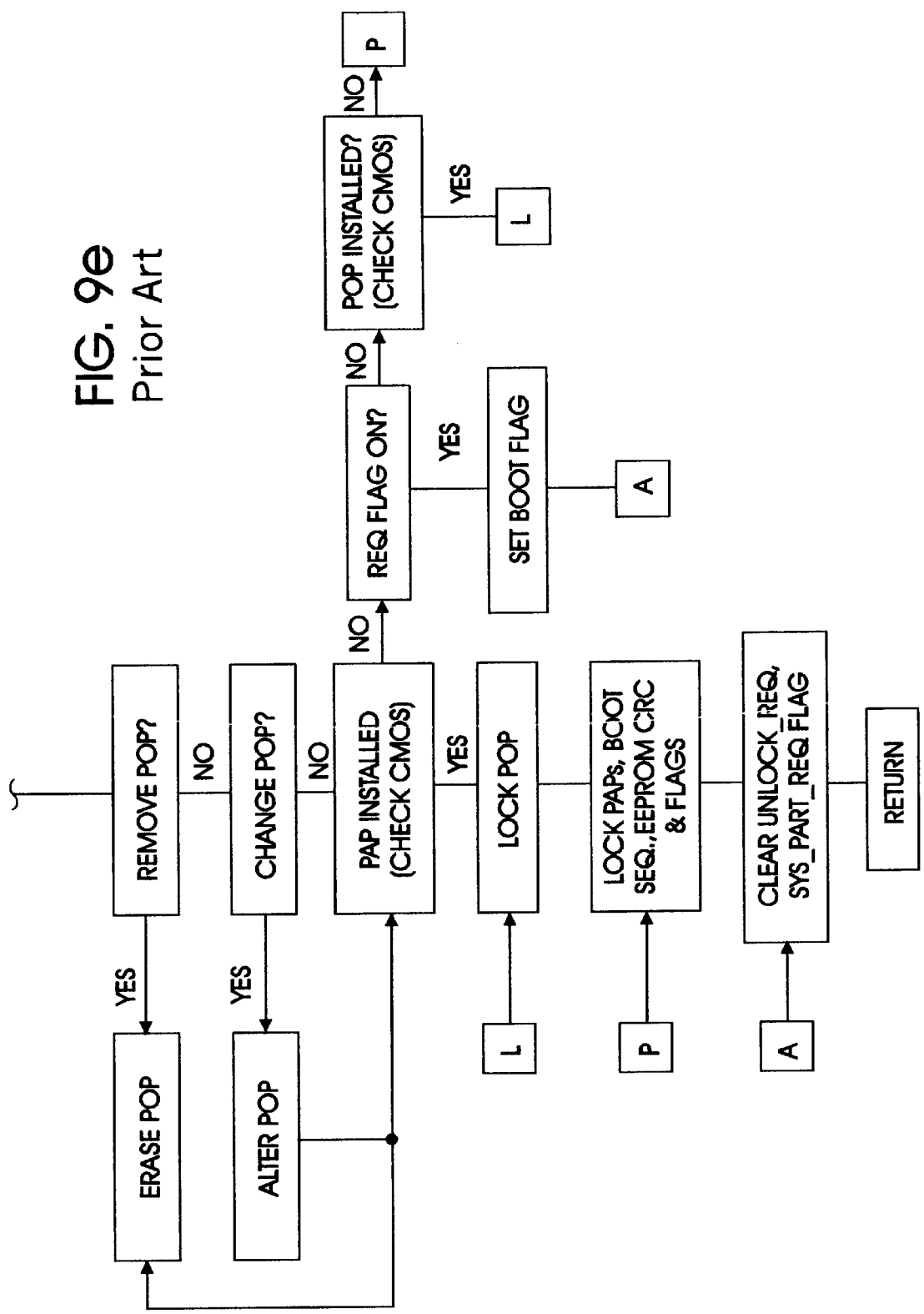

When triggered detector 110 creates an alarm signal by setting a flag bit in a register 114 (see also FIG. 4) to the "on" state. As will be discussed below (with reference to FIGS. 8a–c), this flag is tested by logic in the set up sequence of the computer 10 and, when in the on state, causes the setup logic to be diverted to require a password input to permit the system 10 to become operative.

In a preferred but more complex implementation of the invention, there is additionally provided a second antenna 150 which also collects radiation external of the computer 10. The signal of antenna 150 is applied to an electronic tag 154 which responds to radiation having a second predefined characteristic to emit radiation, using an antenna 152, that bears an encoded serial number. Such electronic tags are known in the art and, for example, the Texas Instruments Capsule Series, 32 mm Transponder, P/N RI-TRP-RR2B may be used. Preferably the second characteristic is a different allowed frequency in the radio band than the first frequency characteristic.

Figure 3:
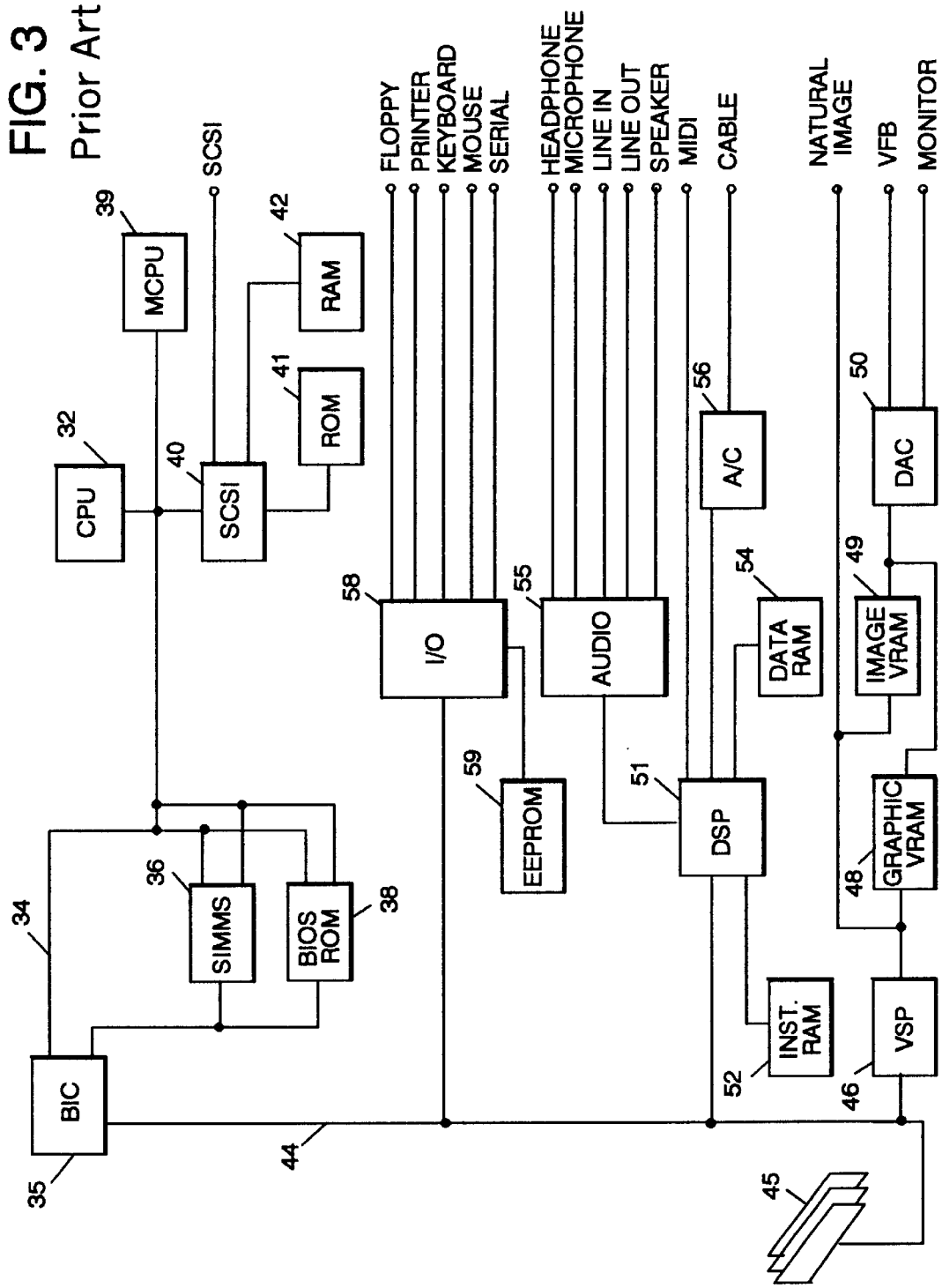
FIG. 3 is a schematic view of certain components of the personal computer of FIGS. 1 and 2.
Figure 4:
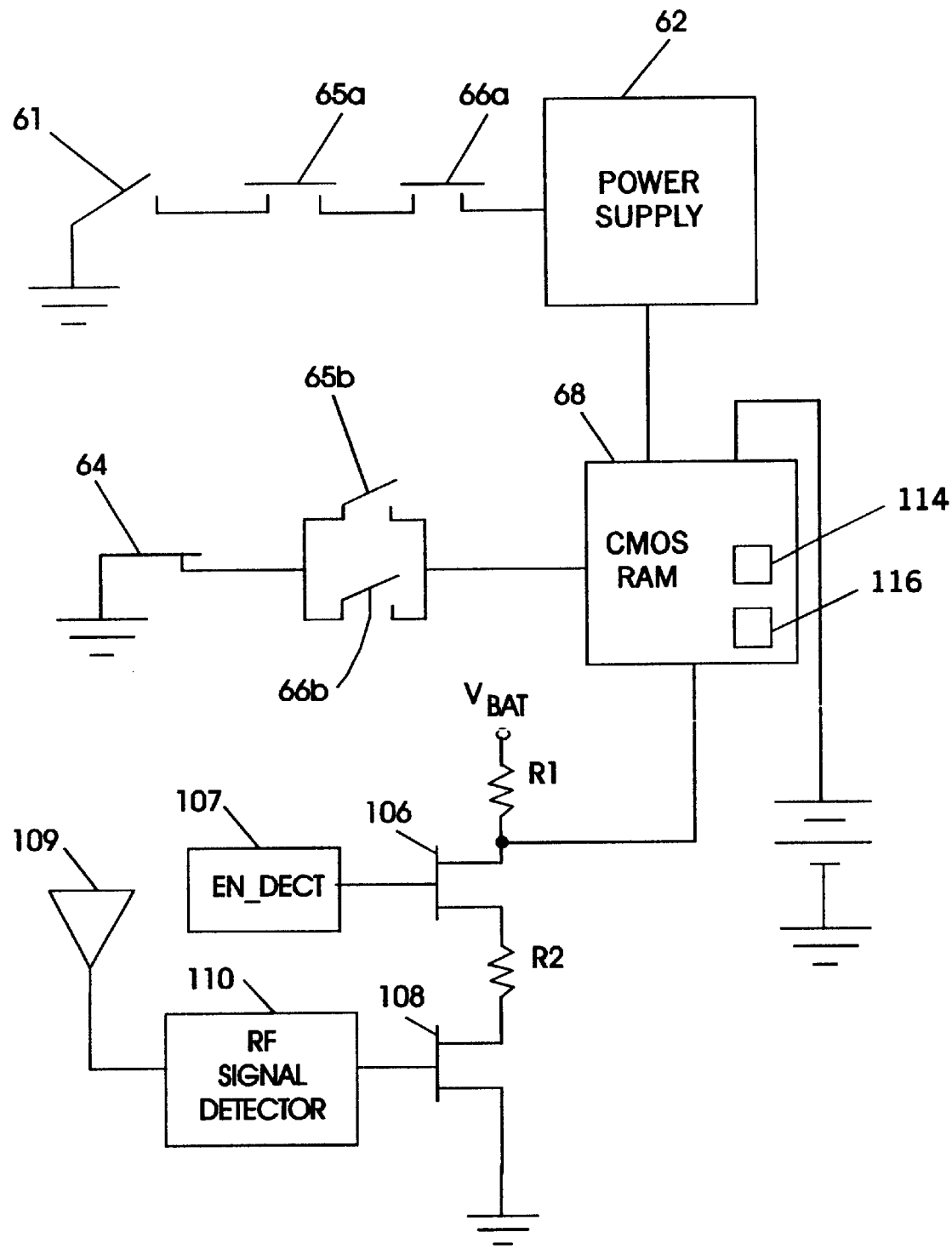
FIGS. 4 and 5 are schematic representations of certain components of the personal computer of FIGS. 1 and 2 which are related to the security features of the prior art and to the security feature of the present invention.

Prior to relating the above structure for the invention to the setup logic of the computer, a summary of the operation in general of the computer system 10 will be reviewed. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the Pentium which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in the BIOS ROM 38 can be copied into RAM 36 to decrease the execution time of BIOS. The system also has, as has become conventional, a circuit component which has battery backed non-volatile memory (conventionally CMOS RAM) for receiving and retaining data regarding the system configuration and a real time clock (RTC) 68 (FIGS. 3 and 4).

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the expansion bus could be Industry Standard Architecture (ISA), Micro Channel Architecture, or Peripheral Connect Interface (PCI).

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable internal or external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components. Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with an input/output controller 58 with an associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port. The EEPROM plays a part in the security provisions described hereinafter.

In achieving certain objectives of securing a personal computer system as described herein, the personal computer system 10 has an erasable memory element mounted within the system enclosure for selective activation to active and inactive states and for receiving and storing a privileged access password (defined more fully hereinafter) when in the active state. The erasable memory element preferably is the electrically erasable programmable read only memory device or EEPROM 59 (FIG. 3) described above. The system also has an option or security switch mounted within the enclosure and operatively connected with the erasable memory element 59 for setting that memory element to the active and inactive states. The option switch (also called security switch in this disclosure) may be, for example, a jumper mounted on the system planar 20 and manually settable to two different states by a person having access to the planar. In one state (also known as the write enable state), the EEPROM 59 is set to be active and to store a PAP as described herein. In the write enable state, the PAP may be written to the EEPROM, changed or removed. In the other or inactive state, the PAP storage capability of the EEPROM is set to be inactive.

Figure 5:
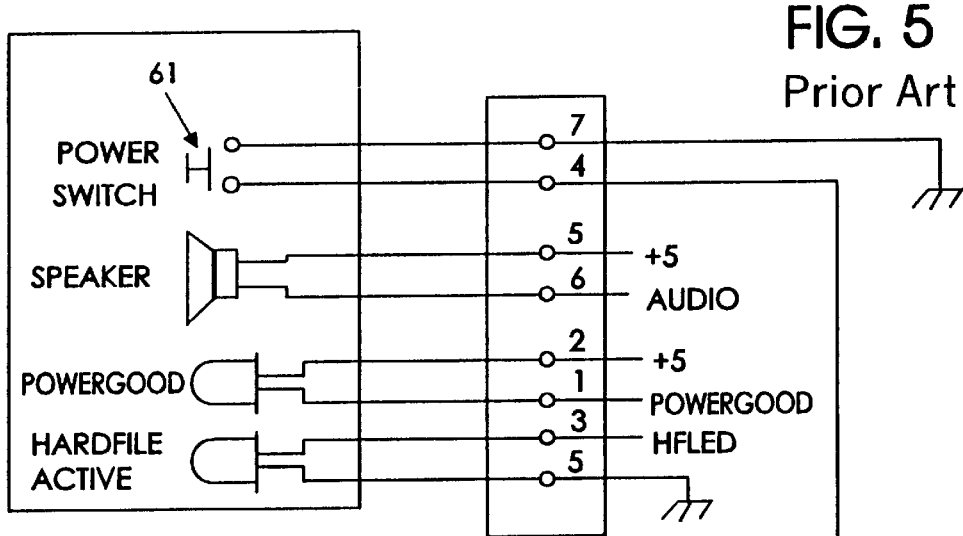
Figure 5:
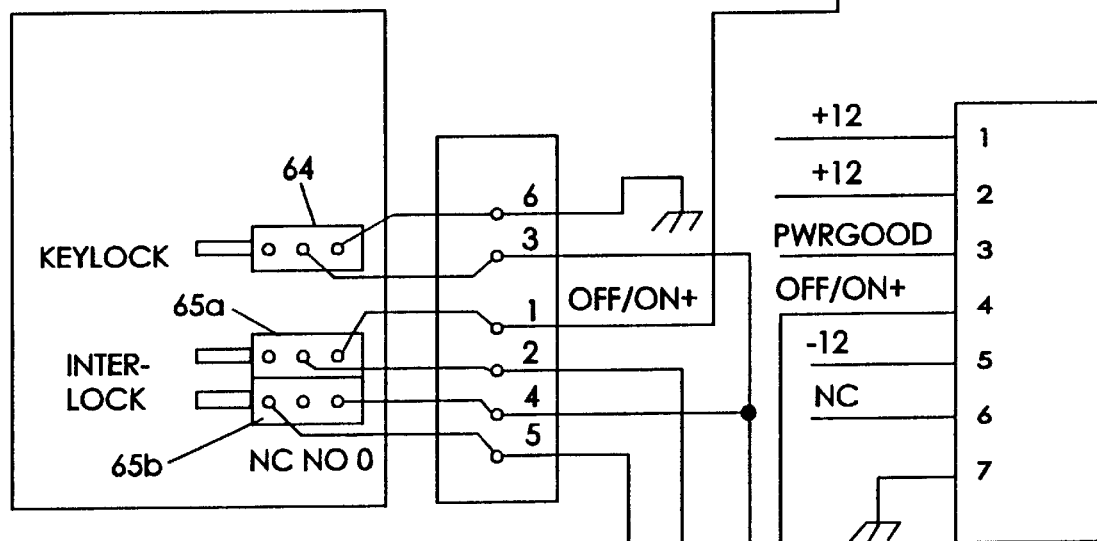
Figure 5:
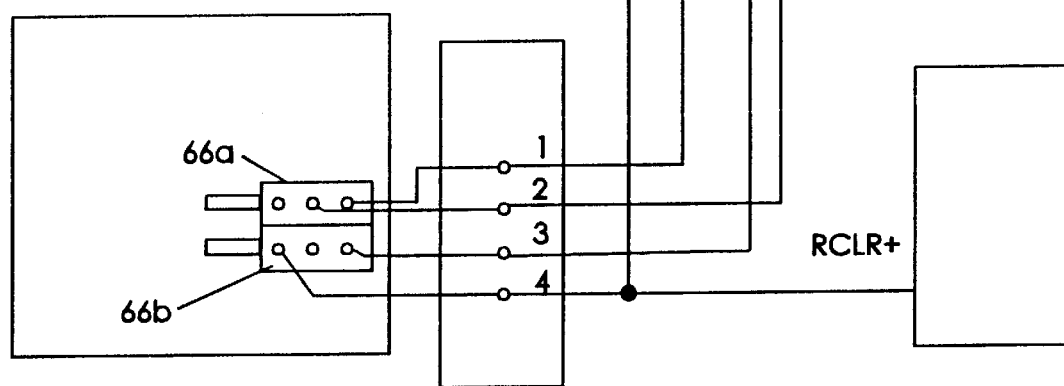
Figure 6:
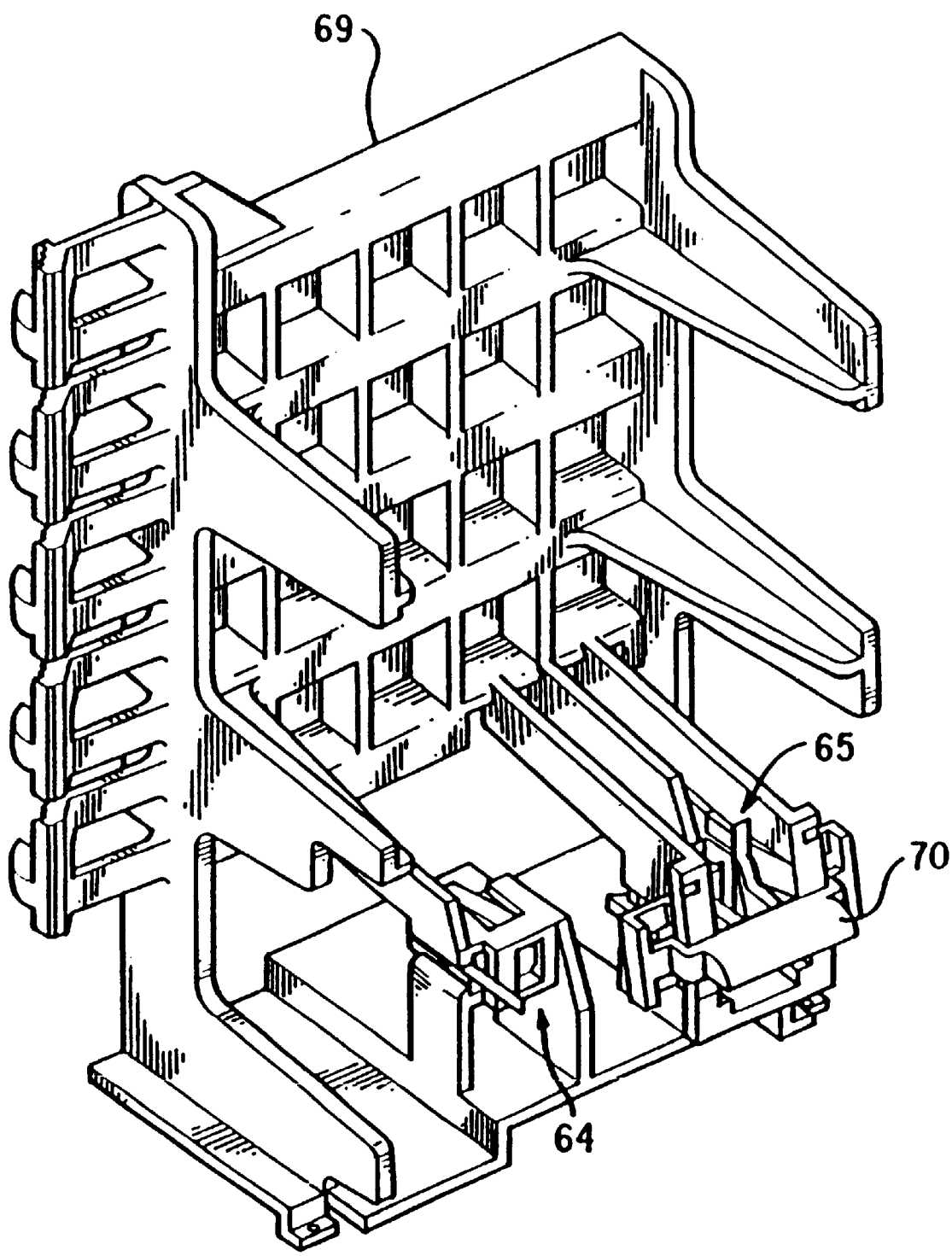
FIG. 6 is an enlarged scale perspective view of certain components illustrated in FIGS. 4 and 5.

As mentioned above, the system 10 also has a second component having erasable memory capabilities, namely battery supported, non-volatile CMOS RAM and an associated real time clock (RTC), indicated at 68 in FIG. 4. The CMOS RAM stores data indicative of the system configuration including data regarding the successful entry of the PAP on power up of the system 10. At least one tamper detection switch (FIGS. 4, 5 and 6) is provided, mounted within the enclosure and operatively connected with the CMOS RAM for detecting opening of the enclosure and for clearing certain data stored in that memory element in response to any switching of the tamper detection switch.

The system processor 32, in accordance with this invention, is operatively connected with the EEPROM 59 and the CMOS RAM 68 and functions in part for controlling access to at least certain levels of data stored within the system by distinguishing between the active and inactive states of the PAP storage capability of the memory element and between entry and non-entry of any valid, stored privileged access password (PAP). By manipulating the option switch, an operator (or more specifically the person charged with supervising and maintaining the security) of the system may select between secured operation of the system and unsecured operation of the system by selecting respective active and inactive states of the EEPROM. If secured operation is desired and to be effectuated, then the system owner must also enter a PAP.

As here disclosed, the system adapted for security concerns in accordance with this invention has two separate non-volatile erasable memory elements—the EEPROM and the CMOS RAM. This is done, in part, because at the time of this invention, EEPROM have a limited life in terms of the number of cycles of erasing and writing, while the indicators of the state of the PAP and the correct entry of the PAP, as well as at least potentially the state of any unauthorized opening of the system enclosure, may need to be erased and written a large number of times. Thus the functions described herein have been separated into first and second erasable memory elements in order to adapt to presently available technology. However, it is contemplated that the two forms of related data may be stored in a single erasable memory element where either technology so permits or a system designer is willing to accept the limitations that follow.

Figure 7:
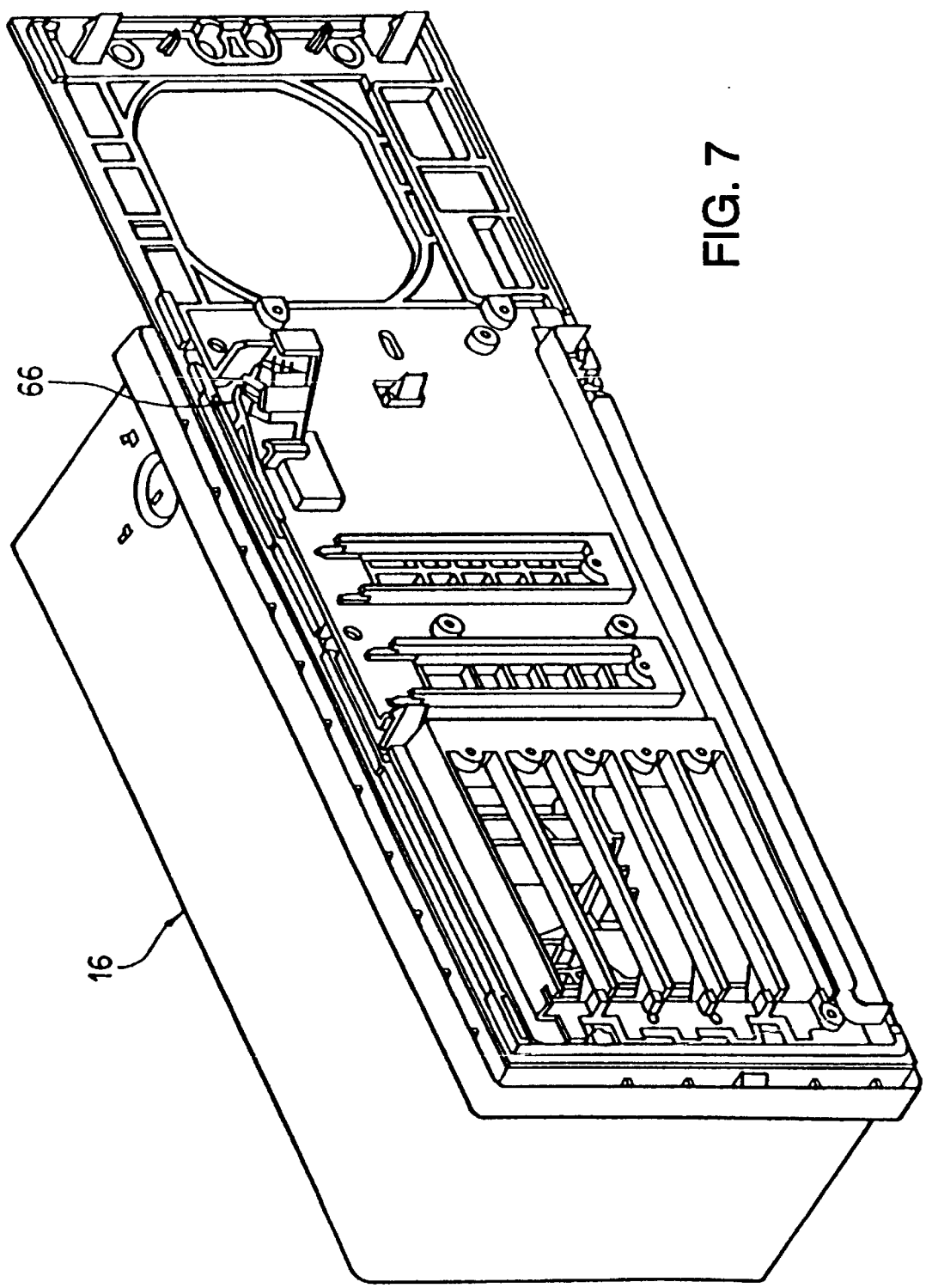
FIG. 7 is a view similar to FIG. 6 of certain optional components of the personal computer of FIGS. 1, 2, 4 and 5.

FIG. 4 illustrates certain relationships among the conventional power control or "on/off" switch 61, the conventional power supply 62, switches which change conductive state in response to opening or removal of enclosure covers such as the main cover 15 and the cable connection cover 16, and a keylock switch 64. The switches which change state on opening or removal of enclosure covers are, as illustrated, two in number; namely a switch 65 (FIGS. 4, 5 and 6) responsive to removal of the main cover 15 and a switch 66 (FIGS. 4, 5 and 7) responsive to removal of the cable connection cover 16. Each switch has two components, one normally open (65a and 66a, respectively) and one normally closed (65b and 66b, respectively). The second switch 66 is optional, as is the cable connection cover 16. However, as will be clear from a thoughtful consideration of the disclosure here made, the presence of the optional cover and switch assures more complete security control over the system.

The normally open contact sets of the cover switches 65 and 66 are connected in series with the main power switch 61 and to the power supply 62 (FIG. 4). As a consequence, if an attempt is made to "power up" the system 10 with the covers removed, the contact sets 65a and 66a will be open and prevent system operation. With the covers in place, the contact sets are held closed and normal system operation may be initiated.

The normally closed contact sets of the cover switches 65 and 66 are connected in series with the keylock switch 64 and to the RTC and CMOS memory 68. The normally closed contact sets 65b and 66b are held open by the presence of the covers 15, 16 and will close on the removal of those covers. The keylock switch 64 is normally held closed on locking of the enclosure lock which is conventionally supplied on the computer system 10. These three contact sets provide an alternate path to ground for current otherwise energizing portions of the RTC and CMOS memory, and have the effect of setting a register 114 of that memory to a distinctive state (such as all "1"s) if energization is lost, as upon unauthorized removal of a cover while the system is in an enclosure locked state. As that segment in memory is checked by POST, setting that segment to a distinctive state will result in a configuration error signal being generated which will alert a system owner that an attempt (successful or otherwise) has been made to breach system security.

In accordance with the present invention, the radiation detector 110 (see FIG. 2) is connected through a transistor 108 to a transistor 106 which responds to the alarm signal to set the alarm flag at a register 114 which is preferably a segment of CMOS RAM 68. The polling loop logic for testing the register 114 is show in FIG. 8a. This signal stored at register 114 is tested by the security logic as will be described more specifically with reference to FIG. 8c and if the register has been set will require entry of a correct password to complete the power-up sequence (see the diagrammatic representation of this logic at FIG. 8c).

The keylock switch 64 and main enclosure cover switch 65 are preferably mounted on a front card guide member 69 (FIGS. 2 and 6) so as to be appropriately positioned relative to the lock provided in the main enclosure cover 15. The front card guide member is mounted in the computer system frame is such a position that an actuating lever 70 for the cover switch 65 protrudes through an opening in an upright front frame member, to be actuated by the cover 15 when present and positioned to close the system enclosure.

The cable cover switch 66 is preferably mounted on the rear panel of the system frame, positioned to be actuated by a latch member mounted on the cable cover 16 and rotatable under the control of a manually operable keylock similar to that provided on the enclosure cover 15. When the optional cable cover 16 is used (as will be the case where full security of the system is desired or required), latching or locking of the cover to the rear panel causes the latch member to close the associated normally open contact set 66a and open the normally closed contact set 66b.

The security and integrity features described above and hereinafter work independently of a previously offered personal computer security feature, the Power on Password (POP). These additional security and integrity features provide a secure platform for operating system certification under applicable regulations such as the Orange Book. An additional password is required to place the system in secure mode. The password is here referred to as the Privileged Access Password (PAP). To maintain compatibility with previous personal computer systems, the POP is still supported. This description so far deals with the security and integrity features as they relate to POST and the password utility executing on a personal computer system with an EEPROM, option switch, and tamper evident covers.

Password Security is implemented by system hardware features; an EEPROM, a security switch and a tamper evident cover switch, firmware, POST and the system software password utility. Once the PAP has been installed, the system is in secure mode. The PAP is saved in the EEPROM. A backup copy of the PAP is also maintained in the EEPROM. This is done to prevent accidental loss of the PAP when a power failure occurs during the installation, change, or removal of the PAP. The POP and at least certain bits indicative of the validity of the PAP (if installed) are stored in the CMOS RTC. Changes in data retained in the CMOS RTC and in the EEPROM are independent one from the other.

Two bits in the EEPROM are used as a state machine that lets POST know exactly where a power outage occurred in the update sequence and, if possible, recover from a system board replacement situation. The password utility maintains the update indicator field, a two bit state machine used during any access to the PAP. If a power outage occurred during the password modification, when power is restored POST checks the state machine (POST actually checks the state machine on all power ups.) If the PAP is updated successfully (a '00' state), POST proceeds in the normal manner. If the update has started before power is lost (a '01' state), POST will check for the presence of a valid backup PAP. If valid, POST copies the backup PAP into the storage for the primary PAP. If the primary PAP has been updated successfully (a '10' state), POST will use the primary PAP (the new PAP) to validate any attempts to use the system reference diskette or boot the system partition. POST will assume the backup PAP is invalid. POST will copy the primary PAP to the backup PAP in this case. If the option or security switch is not in the unlocked or write enable position an error will be displayed. The system owner will have to intervene by unlocking the covers and changing the position of the security switch.

If the backup PAP has been updated successfully (a '11' state), both the primary and backup PAP are considered valid and POST will verify the validity of the Primary PAP, prior to confirming the entry of the PAP by the user.

As mentioned above, the POP is maintained in CMOS memory. Two bits will be maintained in CMOS memory for use as password indicators for the PAP. One indicator is used to signify that the system is in secure mode (PAP installed). The second indicator is to signify that the PAP was entered during the initial power on, cold boot. These two indicators will be initialized and set at a cold boot only. Prior to IPL, the indicators will be write protected unless the system reference diskette or system partition is booted, which requires the successful entry of any installed PAP. Changes in the POP and in the indicators are independent of any changes in the PAP stored in the EEPROM. However, changes in the CMOS memory can indicate security violations that require entry of a valid PAP for recovery permitting the loading of an operating system.

To prevent any unauthorized access to the passwords, the IPL device boot list, the EEPROM CRC, and all the indicators will be locked prior to Initial Program Load (IPL) booting an operating system. To lock out these areas, POST will set special hardware latches that cannot be reset unless the system is powered off. At the beginning of POST Stage I (initial power on), POST will check to see if the EEPROM is locked. If it is locked, POST will display an error and halt the system because the hardware is not functional. The system owner will need to intervene to remedy the situation, which might require that the system board be replaced. In one form, when the system has been tampered with, the first 14 bytes of RAM storage in CMOS associated with the RTC and control registers are unaffected. The remaining segment of CMOS is set to all "one's" (binary value 1) as briefly described above. Upon detecting this condition, POST displays an appropriate error. In another form, as little as a single bit may be set to a state indicative of tampering. In either instance, the system owner/authorized user will need to intervene to remedy the situation which might require entry of the PAP at the password prompt to boot from the system reference diskette or the system partition or that the system board be re-configured.

If the system owner forgets the PAP, the system board(s) affected will need to be replaced. If the POP is forgotten, the system owner can open the covers and toggle another switch on the system board to destroy the contents of the POP in CMOS, and then enter the PAP (if installed) to access the password utility, to reinstall the POP.

When a system has been powered on with a valid PAP installed (Secure mode) but no POP installed, POST will verify the PAP checksum. If the checksum is good, POST will prompt the user to enter the PAP if the user attempts to enter setup. Otherwise, POST will not prompt for a password and the POP, the PAP, the backup PAP, the IPL device boot list, the EEPROM CRC, and all the indicators will be locked to prevent any access. If the PAP checksum is bad, an error is displayed and the system is halted. This is to prevent a condition where POST could accidentally give unprotected access to a user to a system which was previously in secure mode when the EEPROM failed. The system owner will need to intervene to remedy the situation which might require that the system board be replaced.

When the system has been powered on with both a valid PAP and a valid POP installed, POST will prompt the user to enter a password. If the POP is entered, POST will boot from the existing IPL device list. If the PAP is entered at the prompt rather than the POP, the user can enter setup.

Flowchart logic for the scenarios just described are included within FIGS. 8a–8c and 9a–9e, where links between certain steps are indicated by process blocks occupied by single letter designations in order to simplify the charting.

In conjunction with the POST changes, the password utility must include support for the PAP. The utility will support installing, changing and removing a PAP, and will interlock these three functions with the position of the option or security switch. The security switch should remain in the locked position until an authorized user wishes to set the PAP. At that time, the user should remove the system covers and move the security switch to the unlocked (change) position; then the PAP can be set. When the security switch is placed in the unlocked position, hardware logic external to the EEPROM allows the storing of the PAP into the EEPROM. When the security switch is placed in the locked position, external hardware logic prevents any changes to the PAP locations in the EEPROM. Appropriate messages will appear if the authorized user attempts to modify the PAP when the security switch is in the locked position. Also, messages will remind the user to return the security switch to the locked position after the PAP is removed. An additional safety feature is built into the password utility that prohibits the authorized user from setting the PAP equal to the POP. Checks will be made when setting or changing the PAP to ensure that the new PAP does not equal the current POP of the system. Also, when changing or removing the PAP, the current PAP must be known.

It is contemplated that a personal computer system will initially be shipped with the security switch in the locked position and the tamper evident cover locked. This is done to prevent any person other than the system owner from setting the system into secure mode. Unlike the POP, the PAP cannot be erased through hardware manipulation. If the PAP is forgotten or an unauthorized user places the system into secure mode, the system board must be replaced.

The memory elements, switches and their interconnections described herein are referred to in this description as "security feature elements," reflecting that the components named are elements of the computer system which specifically enable the security features described.

As will be understood, a personal computer system having the security capabilities described herein will be subject to attack by unauthorized users seeking to circumvent the security provisions described. One anticipatable form of attack will be a simple physical attack through openings defined in the enclosure provided by the cover 15 and chassis 19. Such openings are provided, for example, for the flow of cooling air through the enclosure; for the insertion and removal of floppy discs and other digital signal storage media; for the attachment of cables and the like; and even for the attachment (during manufacture or thereafter) of fixtures and accessories to be bolted or screwed in place. Any such opening may present an opportunity for the insertion of a probe by an unauthorized user seeking to avoid the security features described. Thus, a knowledgeable attacker might seek to erase the PAP or POP from the memory elements in which that data is stored, or seek to supply power in a way which would defeat the interlock switch arrangements described.

The resolution of protection against such attacks is to mount the memory elements and switches disposed within the computer system enclosure at locations inaccessible to any unauthorized user of the personal computer system attempting to affect the operation of any one of the memory elements and switches by insertion of a probe through an opening. The opening probed may be a ventilation opening for the passage of cooling air or, with ingenuity on the part of the attacker, any other one of the various openings described above. The probe may be a simple mechanical device such as a bent paper clip, or some more sophisticated device configured specifically to reach a security feature element such as those described or to emit some form of energy (electrical, sonic, radiation) which would so disrupt the normal operation of the security feature element as to permit an unauthorized user to gain access to otherwise protected data.

Security feature elements as described above can be protected against probing attack of the types described by being positioned either at such distances from enclosure openings as to defeat mechanical probing attack or at positions shielded by other computer elements which are of a non-sensitive nature. Signal pathways connecting security feature elements and possibly carrying digital signals related to security functions may be protected against attack by being placed in the interior of multiple layer printed circuit boards. Openings defined in the computer enclosure may be configured to restrict or prevent attacking access, as by being configured as tortuous passageways or being occluded by non-sensitive elements.

Again referring to FIG. 4, connection of battery voltage or ground potential to the CMOS RAM 68 depends upon the state of the field effect transistors 106 and 108. When transistor 106 is off, the security feature is not enabled, and battery voltage is always applied to the register 114 of CMOS RAM 68. When the system owner enables the security features the transistor 106 is turned on, by an en__dect signal applied to the input 107 of transistor 106. When antenna 109 passes through the control zone where the first frequency is being transmitted (see also FIGS. 2 and 10), detector 1 10, triggered by the antenna 109, signals transistor 108 to turn on and with transistor 106 also on (security enabled), ground or low potential is applied to set the alarm flag at the register 114 of the CMOS RAM 68. But if radiation with the first characteristic is not present, battery voltage continues to be applied at register 114 of the CMOS RAM 68 since transistor 108 is blocking.

Preferably the register 114 is located in the same storage segment of the CMOS RAM 68 as the registers which are set by the tamper evident switches 65b, 66b when a cover is removed from the system. Thus, both unauthorized passage of the computer system through a control zone when this radiation triggered feature is enabled and unauthorized removal of a cover while the tamper evident feature is enabled both result in the same configuration error and are thereafter handled by the system in the same manner during subsequent power-off, power-on procedures as set forth above with respect to the prior art security feature of the related application, Ser. No. 07/889,325. Accordingly, one bit in the preselected segment of the storage 68 is designated as a register to indicate activation of the cover tampering switches 65, 66 with the feature enabled, and a second bit of the segment is for radiation detected flag bit to indicate activation of transistor 108 with the feature enabled. The switches 65, 66 and transistor 108 set these bits to "1"s when they are activated as shown in FIG. 4.

During a power-on after a power-off, POST determines whether or not the radiation detected flag has been set to "1" by the transistor 108 and prompts for a password (PAP). The power-on logic then only reestablishes system operation upon the successful entry of the PAP, i.e. permits booting of the Operating System from RAM storage 23 (FIG. 2).

At the next power-up from a power-off state, POST will check to see if radiation detection is enabled and if the detection mechanism has been activated. If both conditions are met, POST will prompt for the PAP. After three attempts of incorrectly entering the PAP, POST will disable the system. In order to reactivate the system, it is necessary to power-off the system and then power it on to obtain the prompt for the PAP. Until the PAP is correctly entered, the system will not boot and thus renders the system inactive. POST will render the system inactive after three unsuccessful attempts at correctly entering the PAP in a single power-on session. A power-off and power-on cycle is required prior to being allowed to enter the PAP once-again. If this condition exists, it requires that the user return the system to either the system owner or an authorized user to be re-activated unless the user has knowledge of the PAP.

The systems which include the capability to detect radiation with a predefined characteristic, a register 114 is set upon detection of the radiation. The power-on logic tests this register 114 to determine if security has been breached. If so, the normal power-on sequence is diverted but can be resumed, in a preferred implementation, by entering a correct password. Otherwise, the sequence is halted.

As preferred for the present invention (see FIG. 10), radiation normally applied to the control zone 500 by a transmitter and antenna 501 has a second characteristic. That second characteristic triggers an electronic tag 154 to emit a signal bearing an encoded serial number. An antenna 502 at the control zone 500 collects the coded signal and applies it to a detector 503 that supplies the serial number to a table-look-up computer 506. The radiation applied by antenna 501 also triggers an electronic tag 522, if carried by user 520, to emit a signal bearing an encoded personal ID code. An antenna 502 at the control zone 500 collects the personal ID code and applies it to a detector 503 that supplies such number to a table-look-up computer 506. The computer 506 searches for a match with a list of codes in its storage 508 and determines if user 520 is authorized to transport system 10 through the checkpoint. If no authorization is found a security signal is sent to a transmitter 510 which floods the control zone with radiation having the first characteristic to cause the computer system 10 to set the alarm flag as discussed above.

Figure 10:
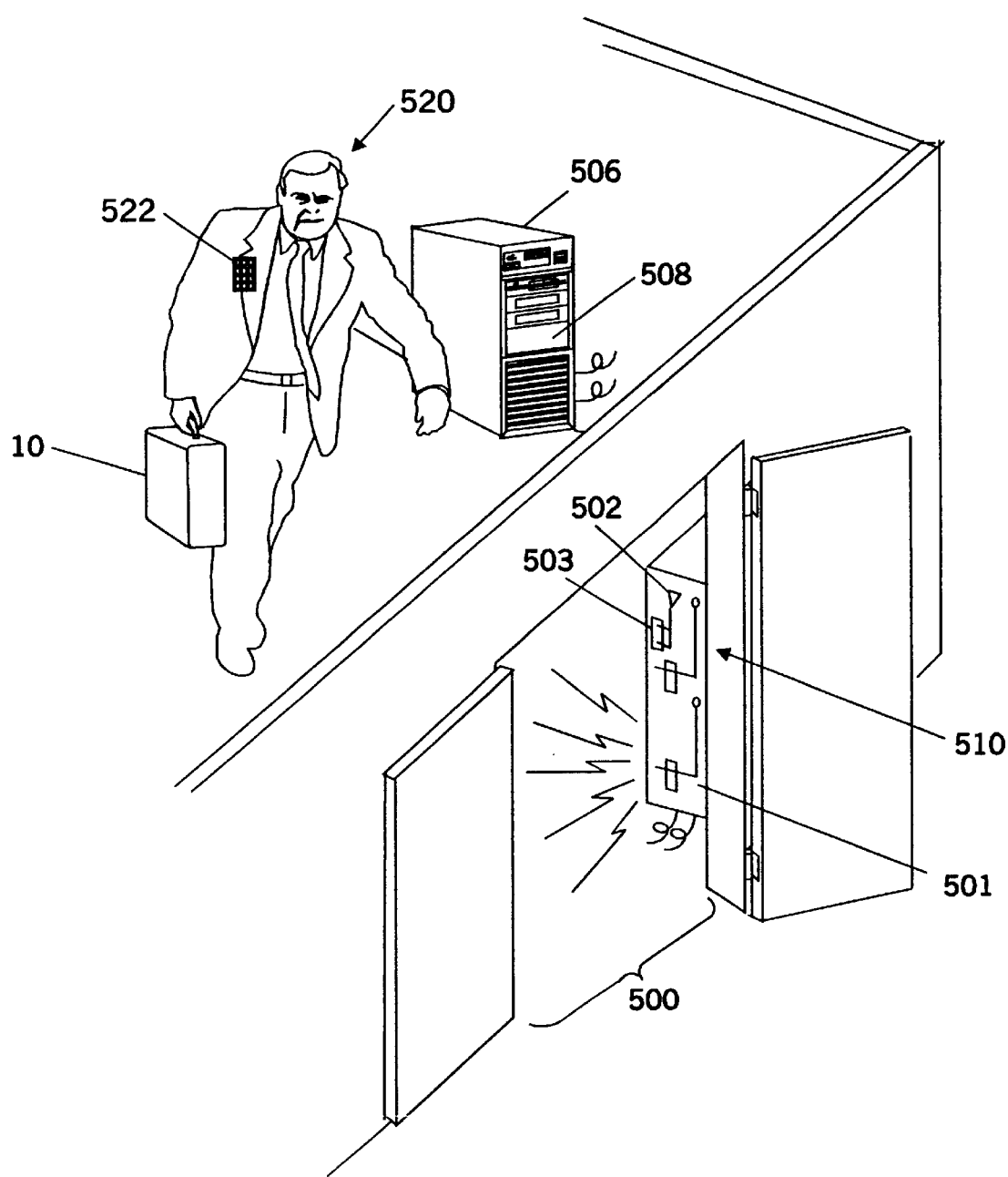
FIG. 10 is a simplified pictorial diagram of a control zone, indicating a radiation field and a computer system prior to entering the radiation field.
Figure 11:
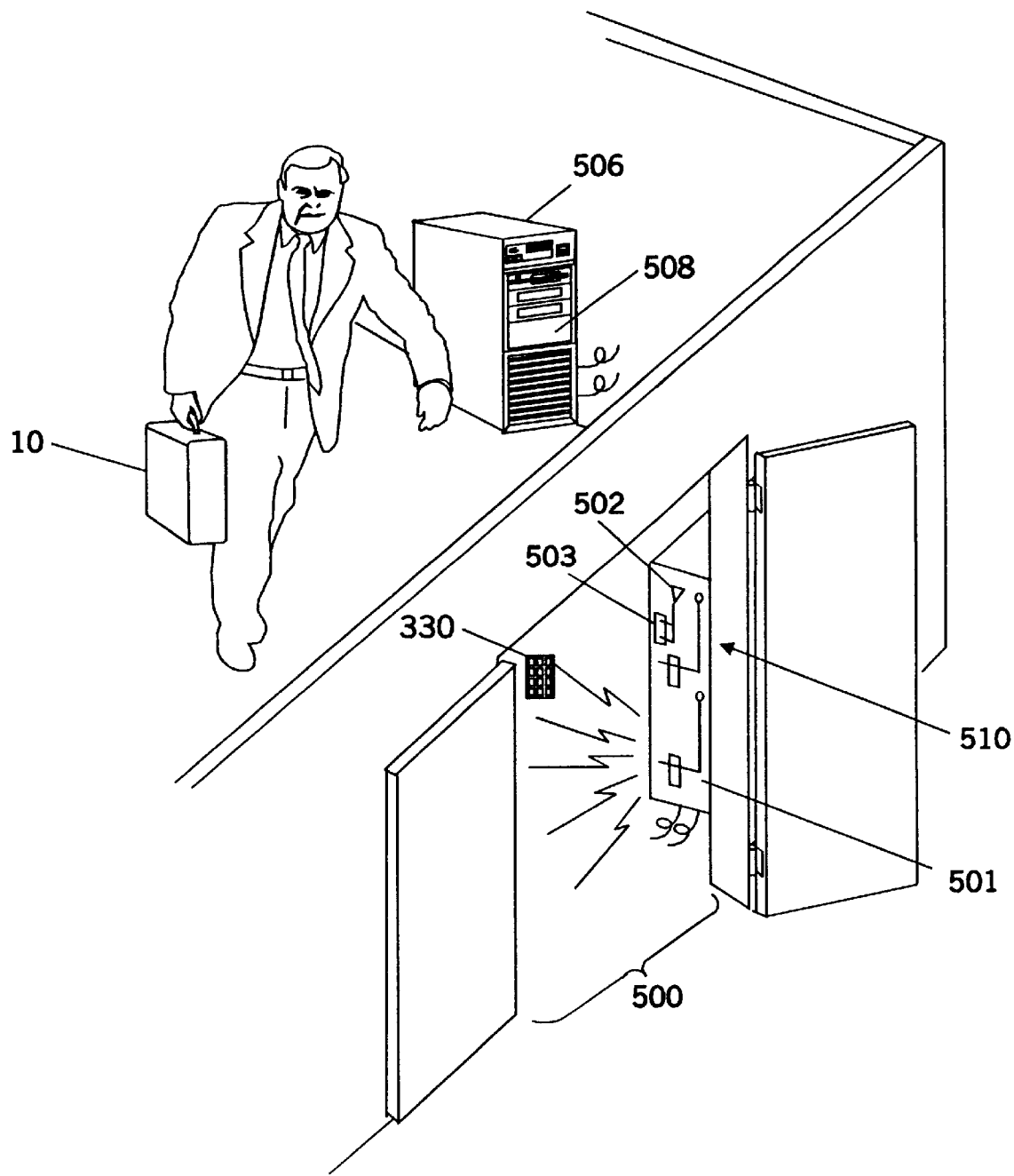
FIG. 11 is a simplified pictorial diagram of a control zone with a keypad for allowing a user to key in an identifier prior to passing through the control zone.

FIG. 11 illustrates a second method to provide a personal ID to computer 506. Located near the checkpoint 500 is located a keypad 530 for entering personal ID numbers or pass codes. If the user 520 enters a identification or pass code on keypad 530, system 506 can use that information to identify user 520 in place of badge 522. This method provides the same level of protection as the first method (described at FIG. 10) but does not require authorized users to also have electronic badges.

One complication with this type of checkpoint or control zone 500 is that the personal ID and system ID may occur simultaneously resulting in a "collision". The RFID tags currently available on the market do include logic to overcome conflicting transmissions. When a collision occurs the tags each delay a respective randomized time before retransmitting to avoid a repeat collision A further complication with this type of checkpoint or control zone 500 is that the order in which the personal ID and system ID are received may vary and there may not be a personal ID received at all. To overcome the problem of reconciling the received signals to trigger a disabling command, if appropriate, requires customized logic, which is preferably implemented by computer 506 performing logic operations as described below.

Figures 12, 12A:
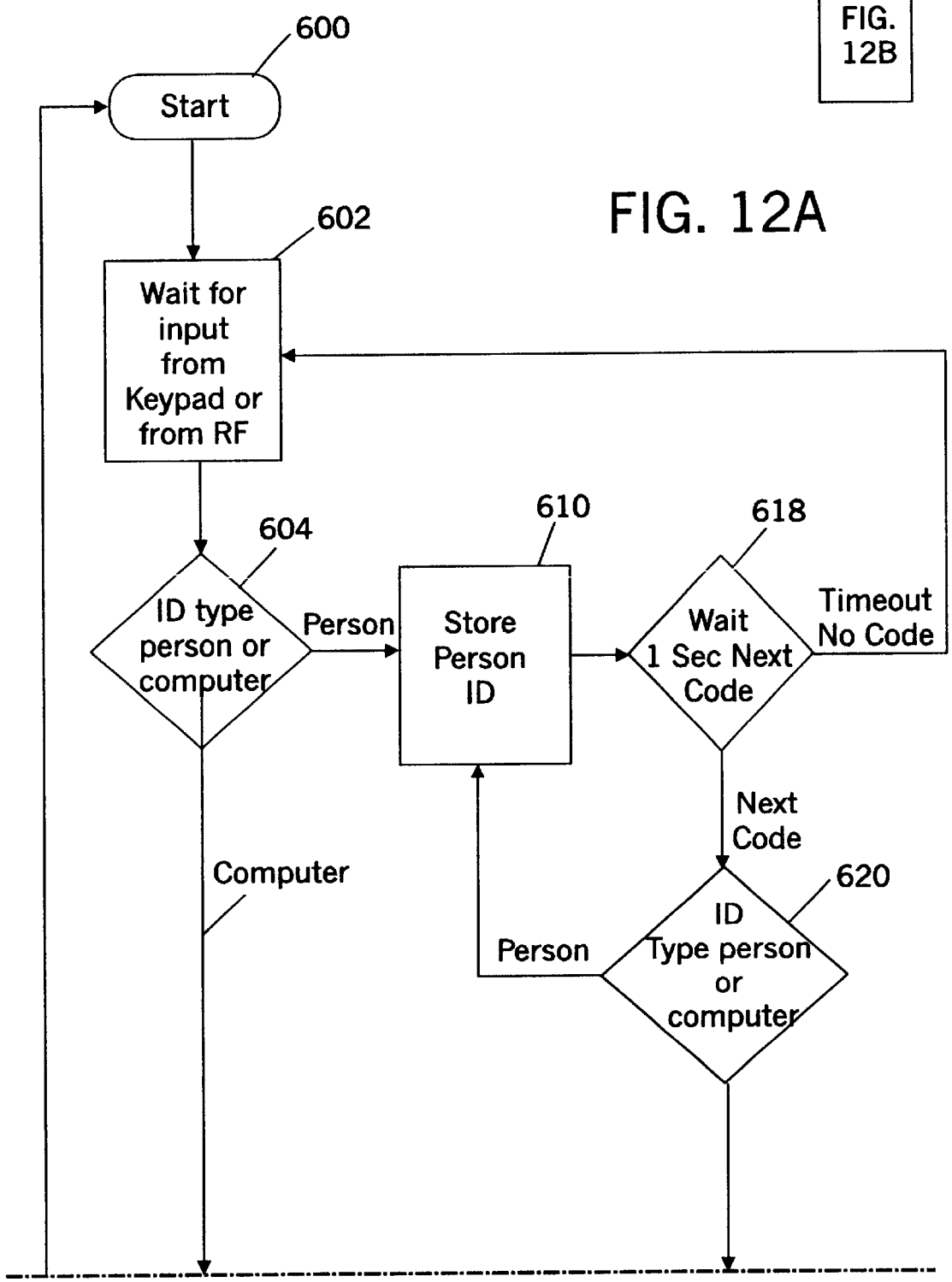
FIG. 12 is a flowchart diagram showing logic for processing identification signals according to the invention.
Figure 12B:
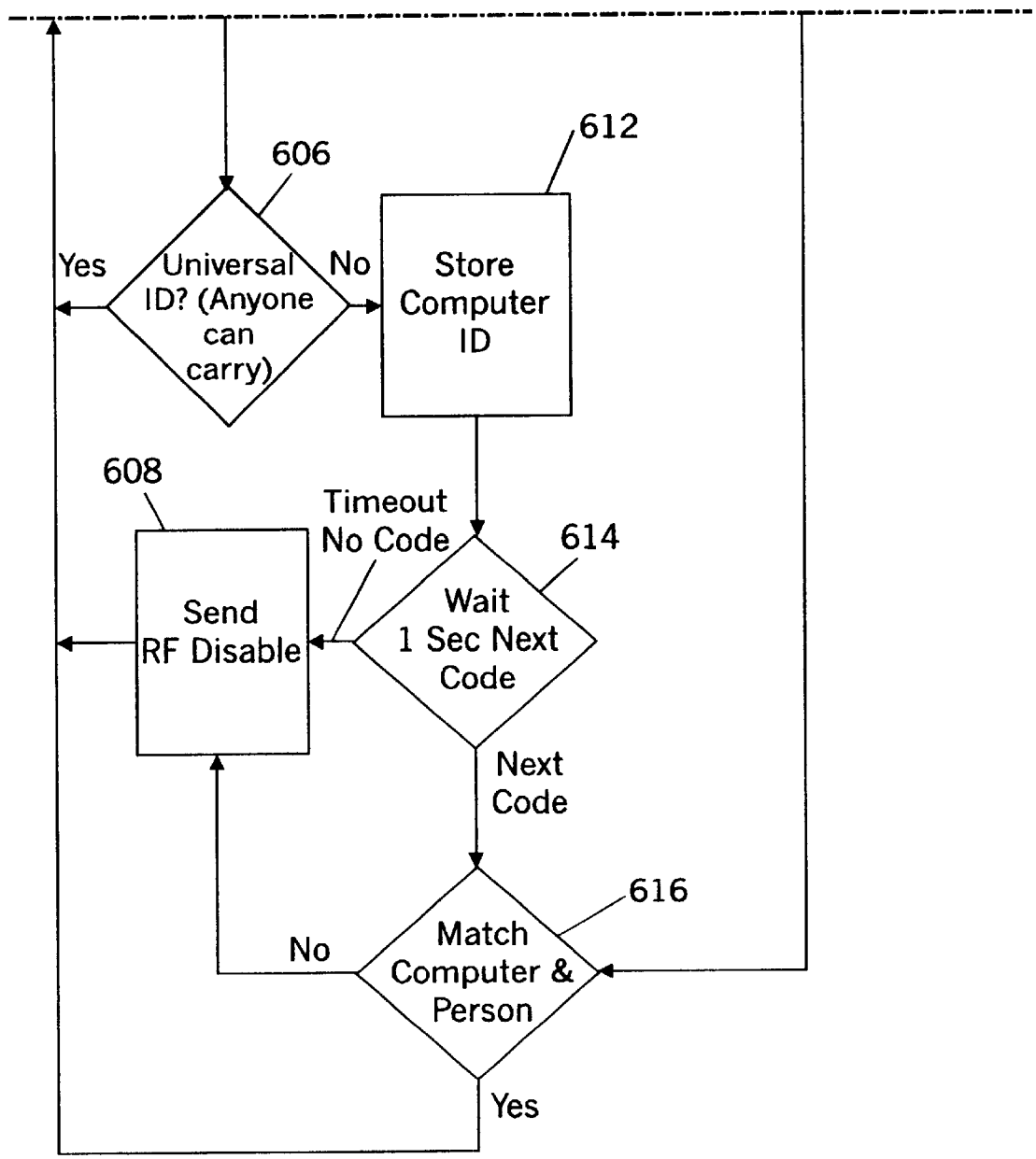

FIG. 12 indicates logic, in flow chart form for reconciling the incoming identification signals and determining if a computer being removed by a person unauthorized to do so. After starting (operation 600) the logic moves to operation 602 and enters a loop waiting for an incoming signal from keypad 530 (FIG. 11) or RFID tags 154 (FIG. 2) or 522 (FIG. 10). An input identification signal is tested (operation 604) to determine if it corresponds to a system or a person.

If a person ID control transfers to store operation 610 and a predefined timed wait period begins (operation 618) to wait for a next incoming code. If no code arrives during the wait period the logic returns to operation 602 as no system 10 is passing through the control zone 500. If during the wait period a code is received it is checked (operation 620). Should the code be a personal code it is stored at operation 610. On the other hand, if the code is for a system, control is transferred to operation 616 where the personal code and system code are compared using a predefined lookup table (preferably stored in computer 506) for a match. If the match fails a disable system command is initiated (operation 608). The system is reset if a match is found and no disablement occurs.

Returning to operation 604, for a system ID control transfers to operation 606 to check for a universal ID (anyone may remove such system) and transfers to reset if a match to a universal ID occurs. If not a universal ID, control transfers to operation 612 to store the ID. Control is then transferred from operation 612 to loop operation 614 which is exited to operation 616 (discussed above) if a code arrives before a predefined wait period . If loop operation 614 times out, a system disable signal is sent (operation 608) as this is a removal with no personal ID being presented.

The instant invention has been shown and described herein in what is considered to be the most practical and preferred embodiment. It is recognized, however, that departures may be made therefrom within the scope of the invention and that obvious modifications will occur to a person skilled in the art that are within the scope and spirit of the claimed invention. For example, the distinctive characteristic of the radiation used at the control zone may be frequency itself or may be a predefined code pattern on a carrier frequency.

What is claimed is:

1. A security system comprising:
    a radiation transmitter at a control zone exposing said control zone to radiation having a second distinctive characteristic;
    at least one computer system having start up logic that on energization sequences the computer system through a process to become operational and includes an identifier device that detects radiation having said second distinctive characteristic and responsively emits radiation bearing a respective encoded system identifier signal;
    identification apparatus for sending a personal identifier signal;
    a receiver near said control zone responsive to said system identifier signal including checking logic which performs a search on a predefined list of identifiers to determine if the received system identifier is listed and corresponds to the personal identifier, said receiver producing an alarm signal if no such match is found;
    a transmitter responsive to the alarm signal to emit radiation having a first distinctive characteristic into the control zone;
    a receiver mounted in said computer system which is responsive to radiation having said first distinctive characteristic to produce a disable signal; and
    security logic cooperating with said start-up logic and responsive to said disable signal to disable said start-up logic from making said computer system operative.

2. A security system according to claim 1 wherein said radiation is a radio frequency signal and the distinctive characteristic is the frequency of the radiation.

3. A security system according to claim 1 which further includes password checking logic, a display device and a user operable input device and wherein said password checking logic prompts the user for a password if an alarm signal is present and disables said security logic from preventing said electronic computing apparatus from becoming operative if the correct password is asserted at said input device.

4. A security system according to claim 1 where one said identification apparatus is an employee badge with a radiation activated tag.

5. A security system according to claim 1 where one said identification apparatus is a keypad at the control zone coupled to the receiver.

6. A security system according to claim 1 where said checking logic, for a selected set of universal system identifiers, produces no disable signal.

7. A checkpoint apparatus for automatically disabling computer systems passing through a control zone which have a tag responsive to a radiation with a distinctive characteristic to trigger radiation of a coded system identification signal and radiation activated disabling logic, said checkpoint apparatus comprising:
    a radiation device for flooding the control zone with radiation having the distinctive characteristic;
    a receiver for receiving a coded system identification signal and a coded personal identification signal input by a person in the control zone;
    checking logic including a storage with a predefined identification signal table which is coupled for receiving the personal and system identification signals from the receiver and compares signals arriving within a preselected time period for a match and if none if found triggers a transmitter to send a disabling signal whereby the disabling logic of a computer system in the control zone would be triggered.

8. A checkpoint apparatus according to claim 7 where personal identification signal is transmitted by is an employee badge with a radiation activated tag.

9. A checkpoint apparatus according to claim 7 which includes a keypad which provides the personal identification signal in response to actuation by a person.

10. A checkpoint apparatus according to claim 7 wherein the distinctive radiation characteristic is frequency.

11. A checkpoint apparatus according to claim 7 wherein the distinctive radiation characteristic is a distinctive code on a carrier frequency.

12. A security system according to claim 1 wherein the distinctive radiation characteristic is a distinctive code on a carrier frequency.

* * * * *